United States Patent [19]

Cheung

[11] Patent Number: 4,707,390

[45] Date of Patent: Nov. 17, 1987

[54] THERMOPLASTIC STRAP WELD WITH ENCAPSULATED CAVITIES

[75] Inventor: Nelson Cheung, Arlington Heights, Ill.

[73] Assignee: Signode Corporation, Glenview, Ill.

[21] Appl. No.: 881,112

[22] Filed: Jul. 2, 1986

Related U.S. Application Data

[63] Continuation-in-part of Ser. No. 871,693, Jun. 6, 1986.

[51] Int. Cl.$^4$ ............................................... B32B 5/18
[52] U.S. Cl. ................................... 428/57; 428/310.5; 428/314.8; 428/317.5; 428/220
[58] Field of Search .................... 428/57, 310.5, 314.8, 428/220, 317.5

[56] References Cited

U.S. PATENT DOCUMENTS

| | | |
|---|---|---|
| Re. 31,353 | 8/1983 | Cheung . |
| 3,331,312 | 7/1967 | Leslie et al. . |
| 3,442,203 | 5/1969 | Kobiella . |
| 3,442,732 | 5/1969 | Stensaker et al. . |
| 3,442,733 | 5/1969 | Vilcins . |
| 3,442,734 | 5/1969 | Ericsson . |
| 3,442,735 | 5/1969 | Stensaker . |
| 3,494,280 | 2/1970 | Kobiella . |
| 3,548,740 | 12/1970 | Kobiella . |
| 3,554,845 | 1/1971 | Billett et al. . |
| 3,554,846 | 1/1971 | Billett . |
| 3,561,350 | 2/1971 | Dorney et al. . |
| 3,586,572 | 6/1971 | Ericsson . |
| 3,669,799 | 6/1972 | Vilcins et al. . |
| 3,799,835 | 3/1974 | Gilmore . |
| 3,984,278 | 10/1976 | Styner et al. . |
| 3,996,403 | 12/1976 | Gould et al. . |
| 4,050,372 | 9/1972 | Kobiella . |
| 4,062,278 | 12/1978 | Cheung . |
| 4,119,449 | 10/1978 | Gould . |
| 4,153,499 | 5/1979 | Annis . |
| 4,158,711 | 6/1979 | Gould . |
| 4,247,591 | 1/1981 | Gould . |
| 4,300,976 | 11/1981 | Wehr . |
| 4,305,774 | 12/1981 | Wedeking . |
| 4,313,779 | 2/1982 | Nix . |
| 4,378,262 | 3/1983 | Annis . |
| 4,450,032 | 5/1984 | Wehr . |
| 4,479,834 | 10/1984 | Kobiella . |
| 4,482,421 | 11/1984 | Gurak . |
| 4,483,438 | 11/1984 | Kobiella . |
| 4,512,844 | 4/1985 | Kobiella . |

FOREIGN PATENT DOCUMENTS 49-4520  2/1974  Japan .

OTHER PUBLICATIONS

Article entitled "Strapping Welded by Friction", published in *The Iron Age*, Jul. 7, 1966, on p. 72.

"Operation, Parts and Safety Manual Signode Spirit TM Strapping Machine", published by Signode Corporation, 2600 West Lake Avenue, Glenview, Illinois, 60025, under the designation 286022 © Signode Corp., 8/85.

Asnisimova, A. P. and R. I. Zakson, "The Vibro-Friction Welding of Plastics," *Svar. Proiz.*, 1964, No. 8, pp. 23–24, (English pp. 45–48).

*Primary Examiner*—Alexander S. Thomas
*Attorney, Agent, or Firm*—Dressler, Goldsmith, Shore, Sutker & Milnamow, Ltd.

[57] ABSTRACT

An improved welded joint is provided for use with overlapping strap portions. Parts of the thickness of each strap portion are merged together to define a continuous joint region. The joint region further includes a plurality of encapsulated cavities distributed at least in the end portions of the joint region.

18 Claims, 27 Drawing Figures

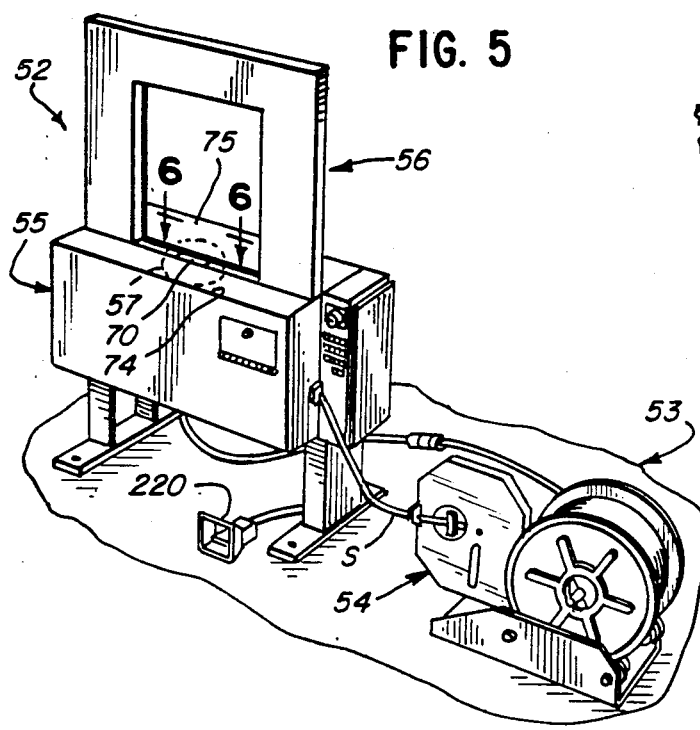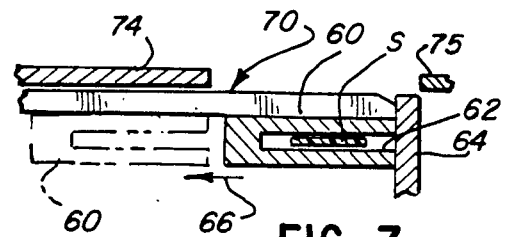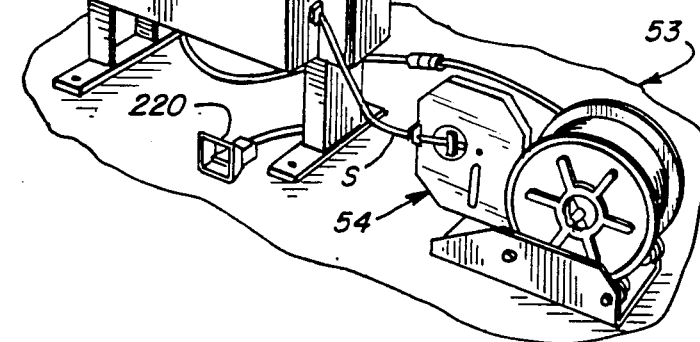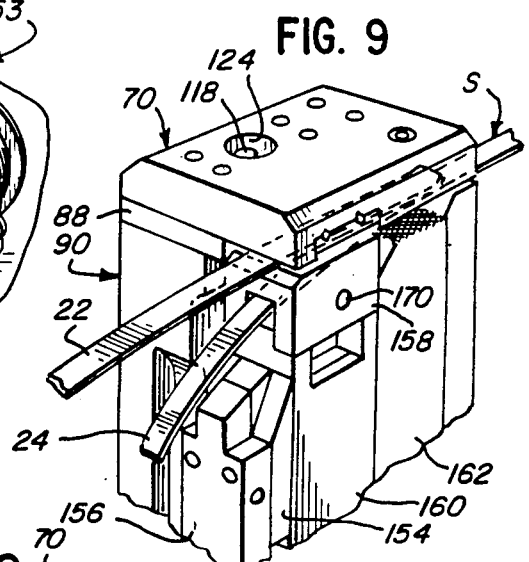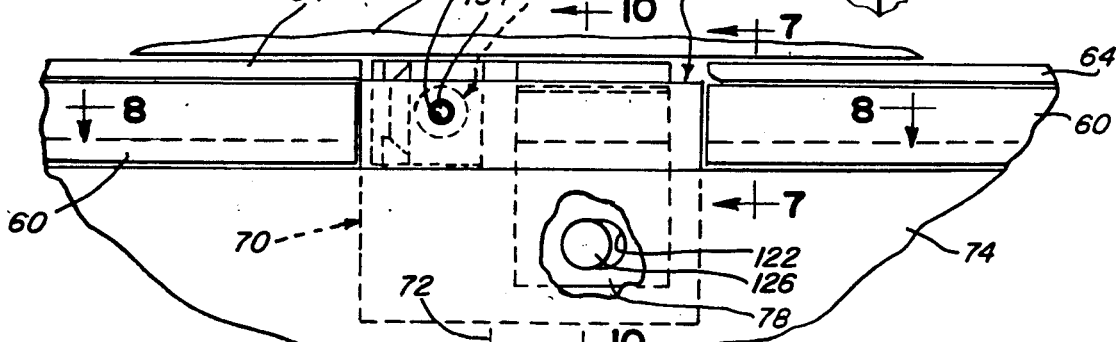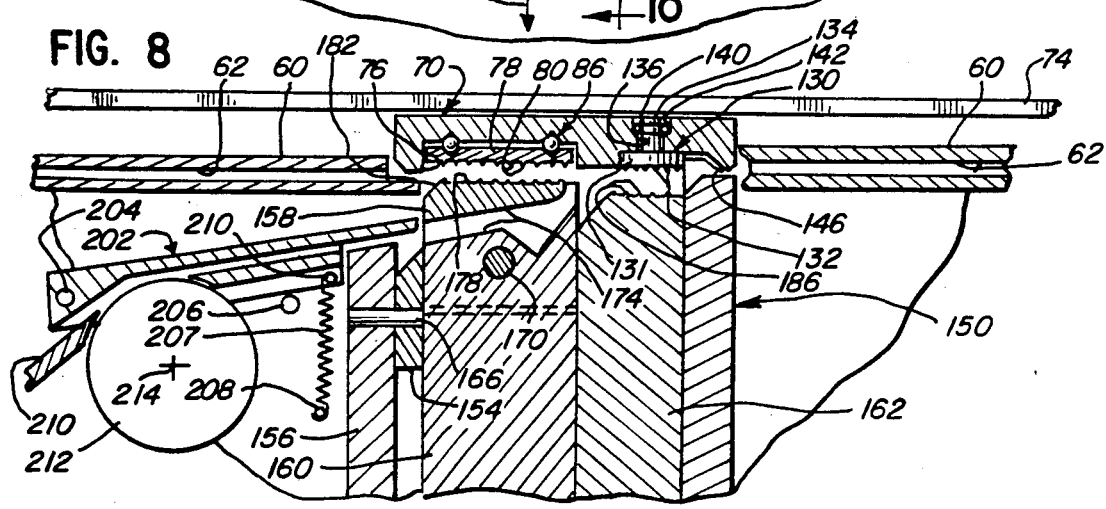

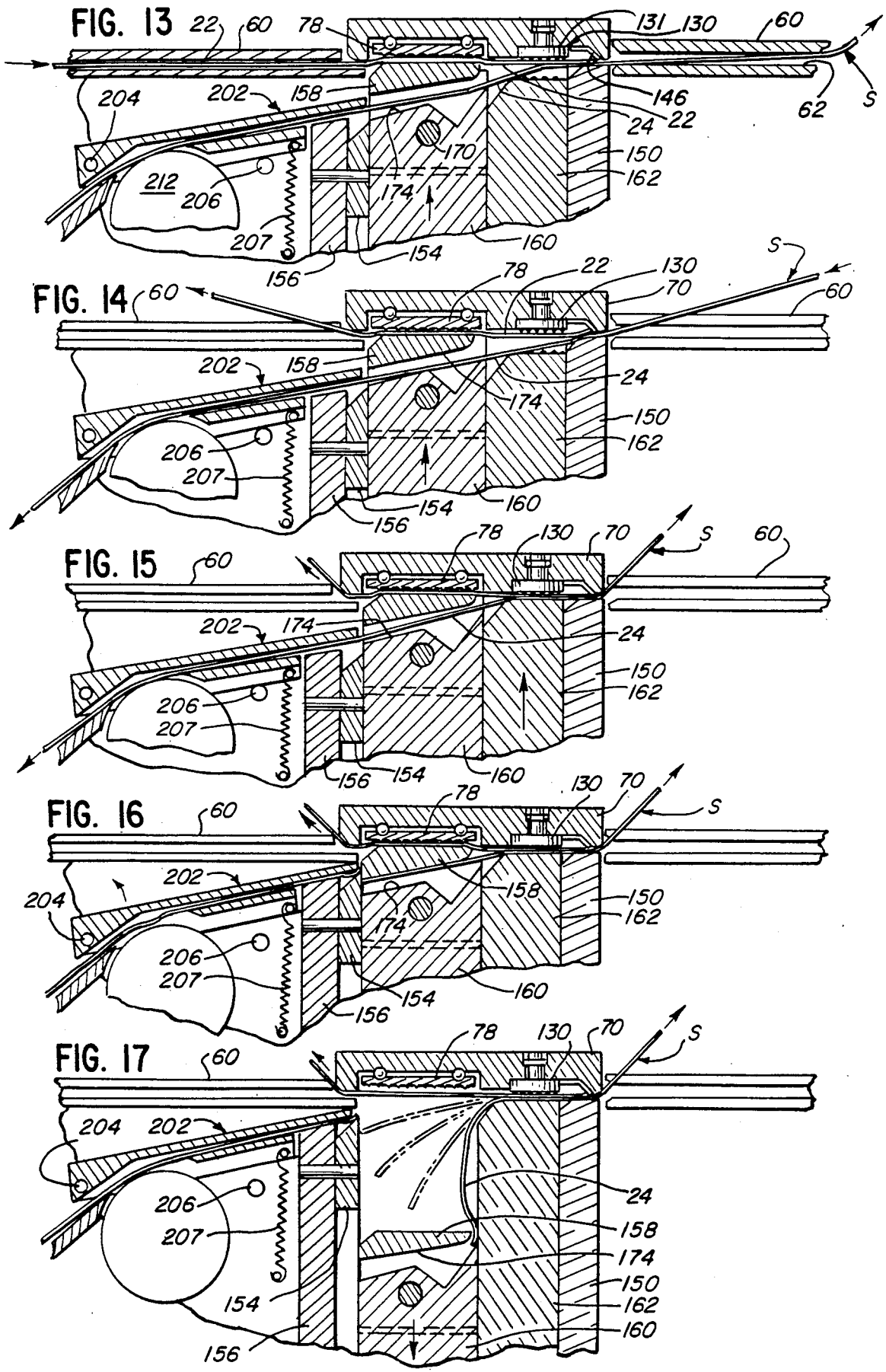

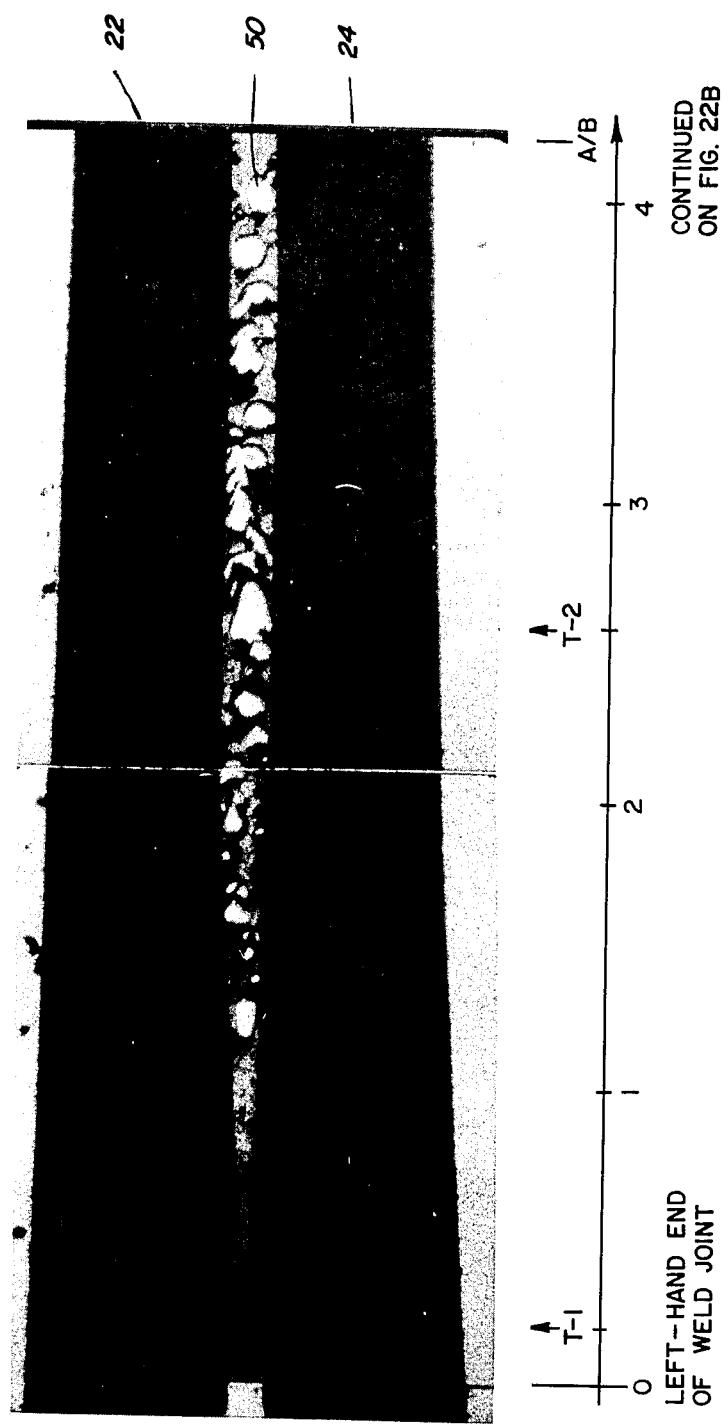

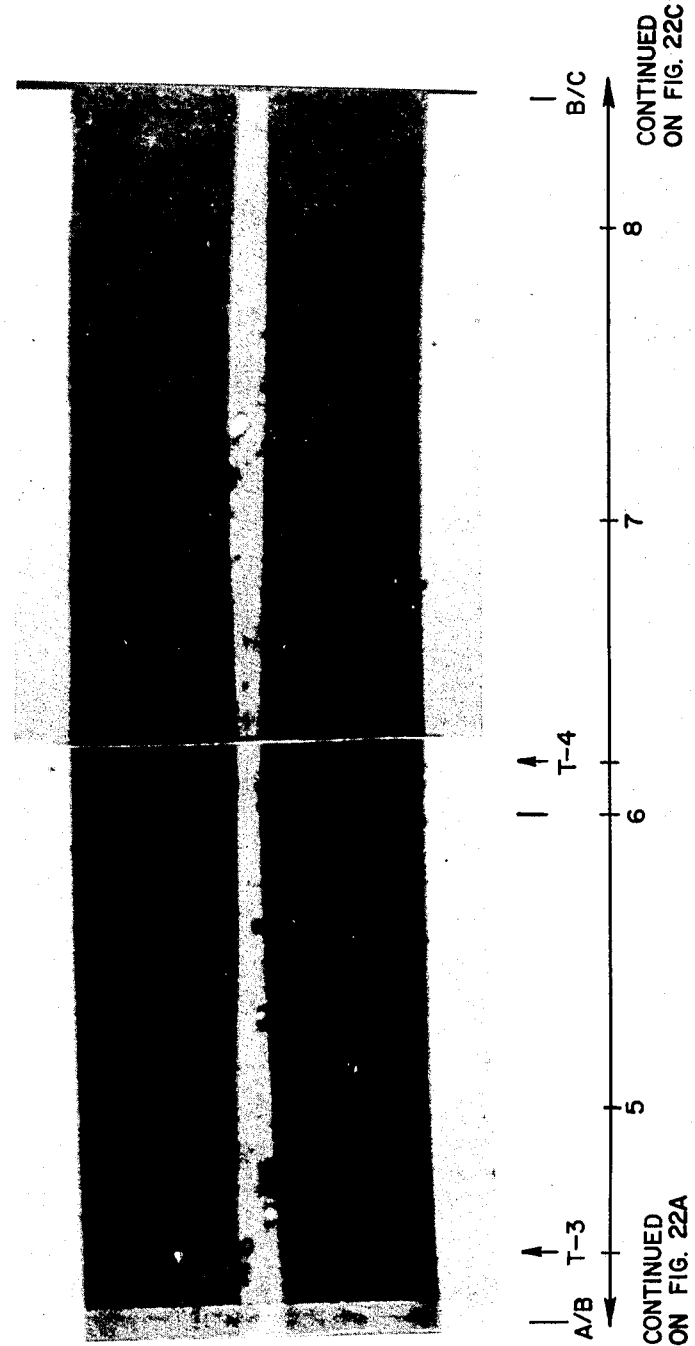

THERMOPLASTIC STRAP WELD WITH ENCAPSULATED CAVITIES

This application is a continuation-in-part application of the copending Ser. No. 871,693 and commonly assigned U.S. patent application of Nelson Cheung and Robert J. Kobiella which is entitled "Method And Apparatus For Producing A welded Joint In Thermoplastic Strap," which was filed June 6, 1986.

TECHNICAL FIELD

This invention relates to a weld for securing together overlapping portions of thermoplastic sheet material, especially strap used to bind articles.

BACKGROUND OF THE INVENTION AND TECHNICAL PROBLEMS POSED BY THE PRIOR ART

A variety of processes have been marketed and/or proposed over the years for welding together overlapping portions of a tensioned loop of thermoplastic strap encircling an article. One process employs a heated member to melt a surface layer of each of the strap portions which are then pressed together while the layers merge and cool to form a solidified weld or welded joint. (The terms "weld" and "welded joint" are conventionally used interchangeably.)

In a different process, the strap portions are pressed together, and a layer of each strap portion at the interface is melted by means of ultrasonic energy. The layers then cool and solidify while the overlapping strap portions remain pressed together.

Another process is effected by first pressing the overlapping strap portions together and then creating a unidirectional or multidirectional bodily sliding frictional movement between the contacting surfaces of the overlapping strap portions so as to melt the interface region of the overlapping stap portions. The melted interface region is allowed to solidify at rest, but under pressure, so as to bond the overlapping strap portions together.

The last discussed process, which can be generally designated as friction-fusion welding or friction welding, has proven to be especially effective with conventional thermoplastic strap materials such as nylon, polyester, and polypropylene. Such conventional strap is typically provided commercially in widths ranging from about 5 mm. to about 13 mm. and in thicknesses ranging between about 0.25 mm. and about 0.89 mm.

Conventionally produced welded joints in thermoplastic strap have found wide commercial acceptance in many applications. However, a conventional welded joint is typically the weakest part of a tensioned strap loop secured about a package or other object. There is a continuing need for an improved welded joint that has greater strength than conventional welded joints in various types of strap and that can be produced routinely and consistently, and in an economic manner. It would be desirable to produce a welded joint that has a strength that approaches, as close as possible, the tensile strength of the strap.

One aspect of the present invention is the discovery that, with certain types of strap, a welded joint can be produced with a unique internal configuration that provides an improved joint with greater strength.

SUMMARY OF THE INVENTION

An improved welded joint is provided between overlapping portions of thermoplastic strap which are arranged in face-to-face relationship. Parts of the thickness of each strap portion are merged together to define a continuous joint region. With oriented crystalline strap, the joint region is an amorphous region which is unitary with a contiguous crystalline region of each strap portion. The joint region further includes a plurality of closed or encapsulated cavities or voids distributed at least in the end portions of the joint region.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same.

FIG. 5 is a simplified, perspective view of the front of a proposed commerical strapping machine embodying a third, and preferred, form of the apparatus;

FIG. 6 is a greatly enlarged, fragmentary, plan view taken generally along the plane 6—6 in FIG. 5;

FIG. 7 is a fragmentary, cross-sectional view taken generally along the plane 7—7 in FIG. 6;

FIG. 8 is a fragmentary, cross-sectional view taken generally along the plane 8—8 in FIG. 6;

FIG. 9 is a fragmentary, reduced, perspective view of the strap gripping and sealing assembly components of the apparatus as viewed from inside the machine and looking toward the front of the machine;

FIGS. 13–21 are simplified, cross-sectional views generally illustrating the sequence of operation of the machine, and, in particular, of the strap gripping and sealing assembly components; and FIGS. 22A–22F are reproductions (not necessarily on a 1-to-1 scale) of a composite of eleven photomicrographs, taken through a polarizing light microscope at a magnification factor of 100, of a longitudinal cross section of one specimen of a welded joint between two strap portions according to the present invention, and FIGS. 22A–22F display the eleven photographed segments of the joint starting with FIG. 22A which shows the left-hand end of the joint and progressing seriatim along the length of the joint to FIG. 22F which shows the right-hand end of the joint.

DESCRIPTION OF THE PREFERRED EMBODIMENTS

This specification and the accompanying drawings disclose only some specific forms as examples of the invention. The invention is not intended to be limited to the embodiments so described, and the scope of the invention will be pointed out in the appended claims.

Some of the figures illustrating embodiments of an apparatus for producing the welded joint of the present invention show structural details and mechanical elements that will be recognized by one skilled in the art. However, the detailed descriptions of such elements are not necessary to an understanding of the invention, and accordingly, are not herein presented.

Figure 1:
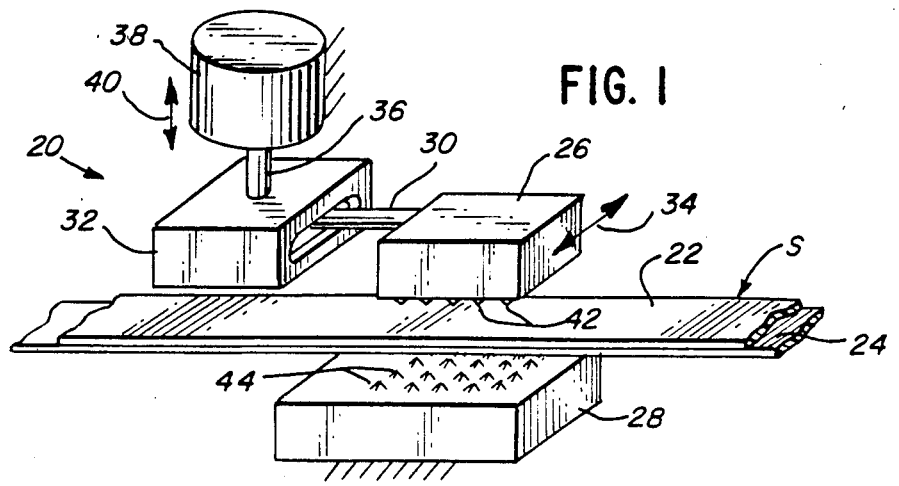
FIG. 1 is a simplified, substantially schematic, perspective view of one form of an apparatus which is capable of producing an improved thermoplastic strap welded joint of the present invention (it being realized that the size of the strap illustrated in this FIG. 1 and in the other Figures has been exaggerated in relationship to the apparatus components so that this relationship is not to scale and so that certain details may be more clearly illustrated)
Figure 2:
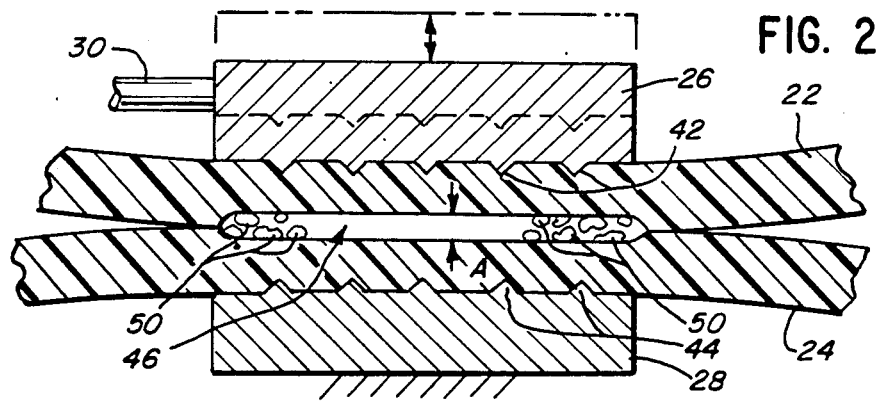
FIG. 2 is a greatly enlarged, fragmentary, cross-sectional view of a portion of the apparatus in FIG. 1, but with the apparatus shown engaging overlapping strap portions while forming therebetween a welded joint (which is not shown to scale)

Simplified Illustrative Method And Apparatus For Producing An Improved Welded Joint One form of a method for producing the improved joint of the present invention is illustrated in FIGS. 1 and 2 wherein the apparatus is schematically represented and is designated generally by reference numeral 20. The apparatus 20 is intended for producing a welded joint between two overlapping portions of thermoplastic sheet or of a strap S having an upper strap portion 22 and a lower strap portion 24. The apparatus 20 can be used with a variety of suitable thermoplastic polymers, especially crystalline synthetic thermoplastic polymers such as polyamides, polyesters, polyolefins, and the like. However, certain of these polymers can provide the improved joint of the present invention as described in detail hereinafter.

The apparatus 20 includes two strap-engaging members, an upper, moveable strap-engaging member 26, and a lower, fixed strap-engaging member 28. Alternatively, the moveable member 26 may be located on the bottom and the fixed member 28 may be located on the top. Also, both members 26 and 28 may be moveable.

Upper member 26 is mounted to a drive rod 30 which is carried in a drive mechanism 32 for moving the rod 30, and hence the upper strap-engaging member 26, in a horizontal direction. Although a variety of motions may be used, in the illustrated embodiment, the motion is one of oscillation or reciprocation. The motion is generally transverse to the length of the strap S (in the directions indicated by the double-headed arrow 34).

The oscillator drive mechanism 32 is mounted to a rod 36 carried in an actuator mechanism 38 disposed at a fixed location. The actuator 38 is effective to move the oscillator drive mechanism 32 and the connected strap-engaging member 26 upwardly or downwardly in the directions indicated by the double-headed arrow 40.

The actuator 38 can be regarded as functioning as a closing means for effecting relative movement between the two strap-engaging members 26 and 28 for pressing the strap portions together. The same actuator 38 can also be regarded as an opening means for effecting relative movement between the members 26 and 28 to subsequently release the pressure on the strap portions. However, it is to be realized that, in an alternate embodiment (not illustrated), member 28 could also be moveable and that, if desired, a separate opening mechanism (e.g., actuator) could then be employed with the member 28 to move it away from the member 26 to release the pressure.

The actuator 38 may be of any suitable type, such as a hydraulic or pneumatic actuator, an electric motor, a cam device, or the like. Similarly, the oscillator drive mechanism 32 may include suitable conventional systems for effecting oscillation of the strap-engaging member 26. For example, an electric motor and coupled eccentric drive system may be provided as part of the mechanism 32.

Preferably, the bottom surface of the strap-engaging member 26 is roughened or has teeth 42, and the upper surface of the strap-engaging member 28 is also roughened or has teeth 44. It is desired that the strap portions 22 and 24 be contacted by the strap-engaging members 26 and 28, respectively, so that relative oscillation movement of one or both of the strap-engaging members will cause the strap portions to be oscillated with the contacting strap-engaging members and relative to each other.

FIG. 2 illustrates the upper strap-engaging member 26 moved downwardly to press the overlapping strap portions into face-to-face contact under pressure at the strap interface. The upper strap-engaging member 26 may be oscillating prior to, as well as during, contact with the upper strap portion 22. Alternatively, the member 26 may be oscillated only after forcing the upper strap portion 22 into contact with the lower strap portion 24.

In any case, relative bodily sliding movement is effected between the two strap portions 22 and 24, and at least part of the thickness of each strap portion fuses or melts at the interface. The melted parts of the strap portions merge and then subsequently resolidify to form the welded joint or weld that is generally designated by reference numeral 46. The nominal thickness of the weld 46 is indicated generally by the reference letter A in FIG. 2. It is to be noted that the oscillator drive mechanism 32, operating with through the strap-engaging member 26, functions as a means for increasing the energy in the strap portions at the interface sufficiently to melt at least part of the thickness of each strap portion.

To produce the improved welded joint of the present invention, the energy in the strap portions is increased in such a manner so as to not only melt at least part of the thickness of each strap portion, but so as to also form a plurality of closed cavities or voids 50 within the molten parts of the strap portions across the width of the interface. Subsequently, the step of increasing the energy in the strap portions (e.g., the step of effecting relative oscillation) is terminated, and the strap portions at the interface subsequently solidify to encapsulate the cavities 50 and form the welded joint. As explained in detail hereinafter, such cavities 50 can result in the welded joint or weld 46 having a greater strength.

Preferably, the welding pressure is released while the strap portions are still molten. Although this early release of pressure is contrary to conventional practice and teachings, it has an advantage, in friction-fusion welding, that the cooling and solidifying strap portions will not be disturbed by the vibratory member as its vibration amplitude is damped to zero upon termination of the welding step.

In the preferred form of the method illustrated in FIGS. 1 and 2, wherein the energy in the strap-portions is increased through the oscillation of a strap-engaging member 26, the oscillating strap-engaging member 26 is disengaged from the strap portion 22 to release the welding pressure while the strap portions are still molten. This has been found to result in the production of the desired cavities 50 under certain conditions.

Figure 3:
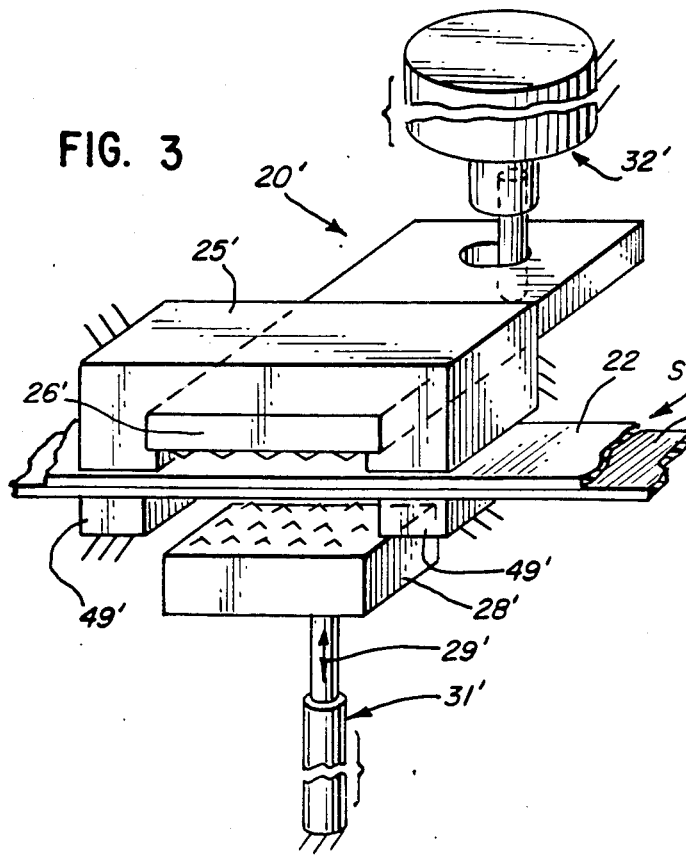
FIG. 3 is a simplified, substantially schematic, perspective view of a second embodiment of the apparatus.
Figure 4:
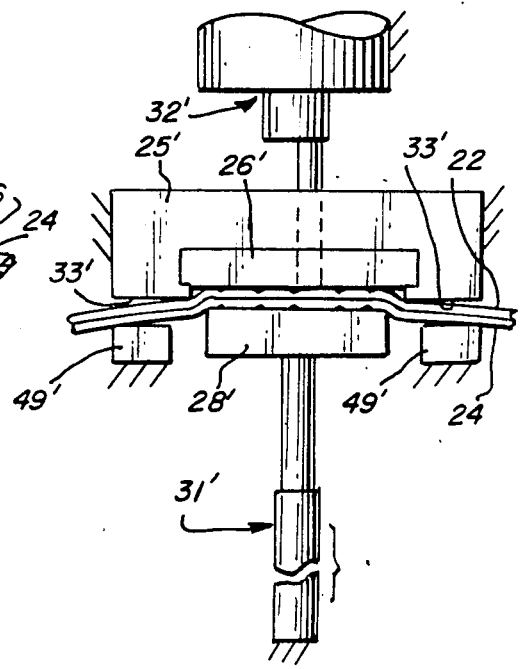
FIG. 4 is a fragmentary, side elevational view of a portion of the second embodiment of the apparatus but with the apparatus shown engaging overlapping strap portions while forming a welded joint therebetween.

FIGS. 3 and 4 illustrate an alternate embodiment of the apparatus for producing the improved joint of the present invention, and the alternate embodiment apparatus is designated generally by the reference numeral 20' in FIG. 3. The apparatus 20' includes two fixed members 49' for supporting the overlapping strap portions 22 and 24. The members 49' are spaced apart to accommodate the movement of a lower strap-engaging member 28' toward and away from the strap portions. The strap-engaging member 28' is moved upwardly or downwardly, in the directions indicated by the double-headed arrow 29', by a suitable mechanism, such as a conventional cam or pneumatic actuator 31'.

The apparatus 20' includes an upper guide block 25' for receiving an upper strap-engaging member 26'. The member 26' is slidably disposed within the guide block 25' and is operably reciprocated transversely of the strap length by a suitable eccentric drive mechanism 32'.

It is to be noted that the bottom surface of the upper strap-engaging member 26' is recessed somewhat above the downwardly facing end surfaces 33' of the guide block 25'. Thus, when the lower strap-engaging member 28' is in the downwardly retracted position away from the strap portions, the strap portions will extend across the guide block 25' out of contact with the upper strap-engaging member 26' owing to the influence of gravity, or inherent strap stiffness, or strap tension, if any.

When it is desired to weld the strap portions together, the lower strap-engaging member 28' is elevated as illustrated in FIG. 4 to press the strap portions against the recessed, upper strap-engaging member 26' which is reciprocated by the eccentric drive 32'. The welding pressure can then be immediately released while the strap portions are still molten.

To this end, the lower strap-engaging member 28' is lowered, and the strap portions 22 and 24, under the influence of gravity, strap tension, and/or their inherent stiffness, move away from the recessed vibrating strap-engaging member 26'. Typically, if this method is effected on overlapping strap portions in a tensioned strap loop, the tension in the strap will aid in quickly pulling the overlapping strap portions away from the strap-engaging member 26' and into the substantially straight configuration illustrated in FIG. 3.

Structural Characteristics Of The Improved Welded Joint

It has been found that the above-described, friction-fusion welding process can be employed to form the cavities 50 in conventional strap, such as polyethylene terephthalate strap, and that an increased strength welded joint is obtained (for selected values of the other variables such as welding time, welding pressure, and the like). Conventional strap is commercially available in the U.S.A. at least in 6 mm., 11 mm., and 13 mm. widths with a maximum thickness of about 0.89 mm. and a minimum thickness ranging between about 0.34 mm. and 0.44 mm., depending on the type of strap.

With reference to FIG. 2, the cavities 50 are dispersed generally across the width of the strap weld 46 and are more generally concentrated toward each longitudinal end of the weld 46 (although cavities need not be located precisely at the distal ends of the weld 46). In the preferred form of the weld, the concentration of cavities 50 in the weld middle portion (e.g., a central ⅓ length of the weld) is substantially less than at the weld ends (e.g., a ⅓ length of the weld at each end).

In one form of the method for producing the improved joint of the invention, the cavities 50 are believed to result from the production of gaseous bubbles during the welding process. It is believed that some types of strap contain significant amounts of an additional material, such as moisture, which can exist as a gas when the strap portions are melted under pressure. For example, polyester and polyamide nylon strap are hygroscopic and can contain some amount of water.

It is believed that when portions of such strap are melted and are under pressure during welding, the generated gas bubbles tend to be forced outwardly toward the edges and ends of the weld. If the welding pressure is terminated while the strap portions are still molten and before all of the bubbles have been squeezed out of the weld area, the remaining bubbles become encapsulated within the solidifying strap material to form the cavities 50.

The exact mechanism by which the cavities 50 are formed under certain conditions as described above is not necessarily fully understood, and there is no intent herein to be bound by any theory or by any explanation as provided above. The number of cavities 50, the size of cavities, and the distribution of cavities in a particular weld having improved strength according to this invention can vary.

The Increased Weld Strength

According to the present invention, when a weld is properly produced which contains the above-described cavities 50, the strength of the weld is greater than the strength of a weld that is produced in the same strap without the cavities 50. The strength of a weld between overlapping strap portions is conventionally determined by tensile loading of the welded strap portions and comparing the load at weld failure to the load required to rupture a virgin length of the strap per se. For example, the strength of welds in conventional commercial polyester strap typically ranges between about 35% and about 55% when such welds are made by conventional friction-fusion techniques in commercial strapping machines (e.g., the power strapping machine sold under the designation "MCD 700/300" by Signode Corporation, 3600 West Lake Avenue, Glenview, Ill., 60025, U.S.A.). In comparison, a polyethylene terephthalate polyester strap weld having cavities 50 produced as discussed above may have a joint strength of 60% to 80% or higher.

It is believed that the improved joint strength of the weld results from the redistribution of stresses within the weld, and that the cavities 50 cause the stress redistribution. More specifically, it is believed that welds fail when cracks form at the ends of the weld. The cavities are believed to reduce the stresses at a crack tip that is propagating into one or more of the cavities. It is believed that the most effective cavities in redistributing or reducing the stress are those that have a largest cross-sectional dimension of about 50% of the thickness of the weld. It is further believed that the substantially reduced concentration of cavities in the middle of the length of the weld produces lower nominal stresses in the weld and consequently reduces the local stress at the cavities that are concentrated at the ends of the weld.

The exact mechanism by which the cavities increase the weld strength is not necessarily fully or accurately understood, and there is no intent herein to be bound by any theory or by any explanation as provided above.

The Preferred Operational Parameters For Obtaining The Improved Welded Joint

Insofar as parameters affecting the increased strength weld have been presently investigated, it has been found that improved weld strength can be consistently produced under certain conditions with polyester strap, especially that polyester strap sold in the U.S.A. by the aforementioned Signode Corporation under the commercial product designation "Tenax B" strap. This is a polyethelene terephthalate composition having an intrinsic viscosity of about 0.95. Improved welds have also been produced in polyethelene terephthalate strap which has an intrinsic viscosity of about 0.62 and which is sold by Signode Corporation under the product designation "Tenax A" strap. These materials have the capability of being provided with varying degrees of uniaxial orientation sufficient to provide the strengths desired for a variety of specific conventional strapping applications.

The improved weld strengths have been obtained with such strap in the commercially available sizes identified hereinbefore. The improved welds were made using a presently preferred process for initially increasing the strap energy, and that preferred process is friction-fusion welding. The improved welds were made with weld lengths of about 16 mm. and about 19 mm., but it is believed that the weld length per se is not critical. The minimum length of the weld for a desired weld strength would depend upon, inter alia, the strap width as well as the selected combination of the other weld process parameters discussed hereinafter.

The friction-fusion process for producing the improved strength welds includes vibrating at least one of the overlapping strap portions (transversely of its length in the preferred embodiment), preferably at a frequency between about 300 hertz and about 500 hertz under a preferred welding pressure between about 5.0 megapascals and about 12.6 megapascals. The welding interval is preferably between about 100 milliseconds and about 800 milliseconds. The vibration amplitude is preferably between about 0.8 mm. and about 2 mm. An amplitude of about 1.6 mm. with a welding interval of about 150-200 milliseconds has been found to work well in a prototype for a proposed commercial welding machine described in detail hereinafter.

The weld pressure is released at the end of the welding interval while the strap portions are molten. The weld is permitted to cool in air at standard or normal ambient temperature and pressure, preferably for a time interval of at least about 50 or 60 milliseconds before any significant tension load is applied to the welded strap.

As discussed above, the cavities 50 (FIG. 2) (which are believed to contribute to increased joint strength) are thought to result from material in the strap, such as moisture, that forms gaseous bubbles in the molten weld region. It has been proposed to add such material to the weld region environment before or during welding if the strap otherwise lacks sufficient quantities of such material.

It has also been proposed to add such bubble-producing material directly to the surface of strap that does not normally contain such material. For example, conventional polypropylene strap does not hold moisture in amounts sufficient to form bubbles when the strap is welded in accordance with the methods described herein. However, a layer of a bubble-forming material could be coextruded on each surface of polypropylene strap. Such a layer could be a polyester strap material that normally contains amounts of moisture believed to be sufficient to generate the bubbles during the welding process.

To the extent that the weld cavities 50 (FIG. 2) may result completely, or partly, from moisture adsorbed or absorbed by the strap, the relative humidity of the atmosphere surrounding the strap during the welding process is presently believed to have some effect. To the extent revealed by present investigations, the most improved weld strengths are more consistently achieved with strap in an atmosphere where the relative humidity is about 60%.

EXAMPLES

The present invention is further illustrated by the following examples.

EXAMPLE I

The composite photomicrograph illustrated in FIGS. 22A-22F (not necessarily on a 1-to-1 scale) shows, at a magnification factor of 100, a longitudinal cross-section of a welded joint according to the present invention. The joint was made by friction-fusion welding of two overlapping, untensioned segments or portions 22 and 24 of oriented polyethylene terephthalate strap having an intrinsic viscosity of about 0.62.

The welded joint between the two strap portions 22 and 24, having been formed by a melting and resolidifying of the strap material, is amorphous (unoriented) and appears generally transparent and relatively light in color under the polarized light. The material in the strap portions that did not melt to form part of the welded joint remains oriented and, under the polarized light of the microscope, appears generally opaque and relatively darker in color.

The nominal thickness of each strap portion 22 and 24 is 0.5 mm., and the width of each strap portion is 11 mm. The welding process was carried out on a test apparatus having two members for pressing the strap portions together in registry for about 19 mm. along the length of each strap portion.

One of the members was a vibrator weld plate for vibrating one of the strap portions transversely of its length relative to the other portion. The strap portions were pressed together between the two members with a pressure of about 6.3 megapascals, and one of the strap portions was transversely oscillated relative to the other strap portion at a frequency of about 316 hertz and at an amplitude of about 1.6 mm. The welding or vibration time was 250 milliseconds. The welding pressure on the overlapping strap portions was released while the weld plate was still vibrating at 316 hertz.

FIGS. 22A-22F illustrate the thermoplastic strap portions 22 and 24 arranged in a face-to-face configuration to define an interface having a length and width corresponding with the orientation of the length and width, respectively, of each strap portion. The nominal thickness of each overlapping strap portion is indicated on the right-hand end of the welded joint in FIG. 22F by the reference letter D.

The welded joint comprises at least part of the thickness of each strap portion at the interface which has been resolidified from a fused state across the width of the interface from one side to the other and along the length of the interface from one end to the other end. The left-hand end of the joint is shown on FIG. 22A and the right-hand end of the joint is shown on FIG. 22F.

Figure 22C:
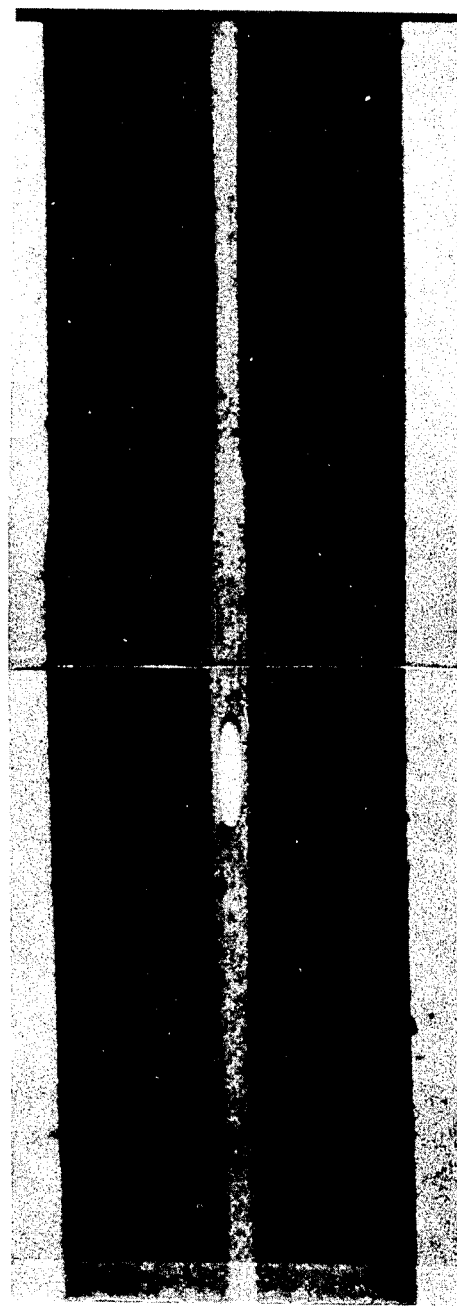
Figure 22D:
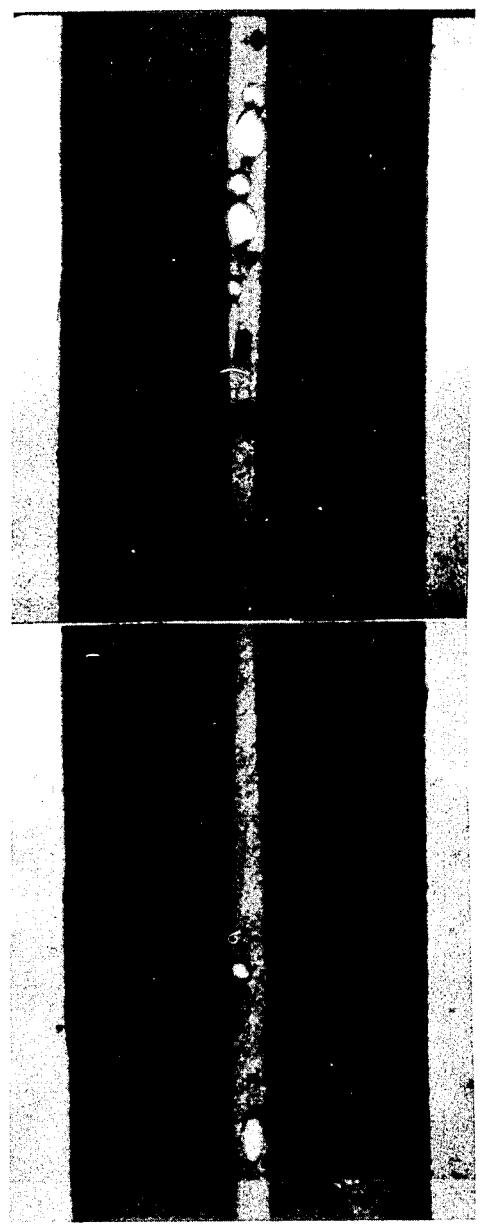
Figure 22E:
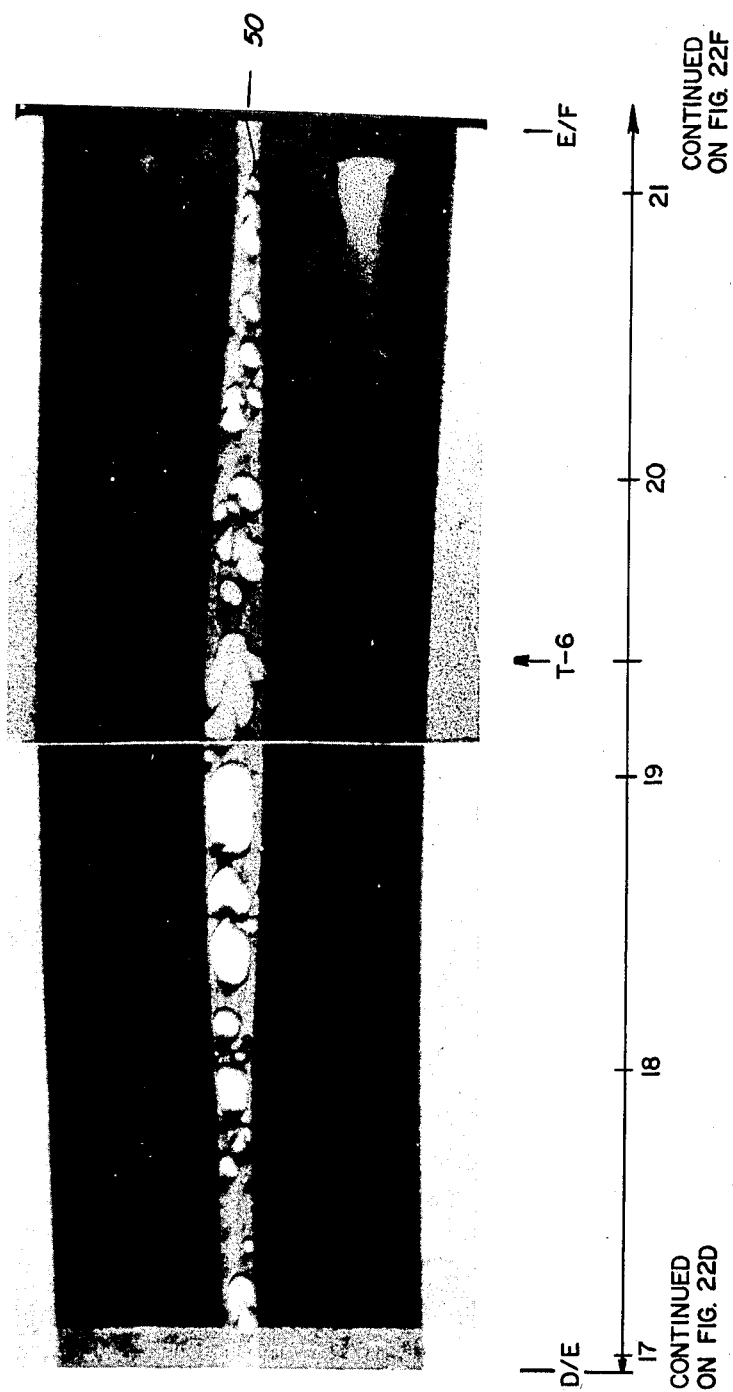
Figure 22F:
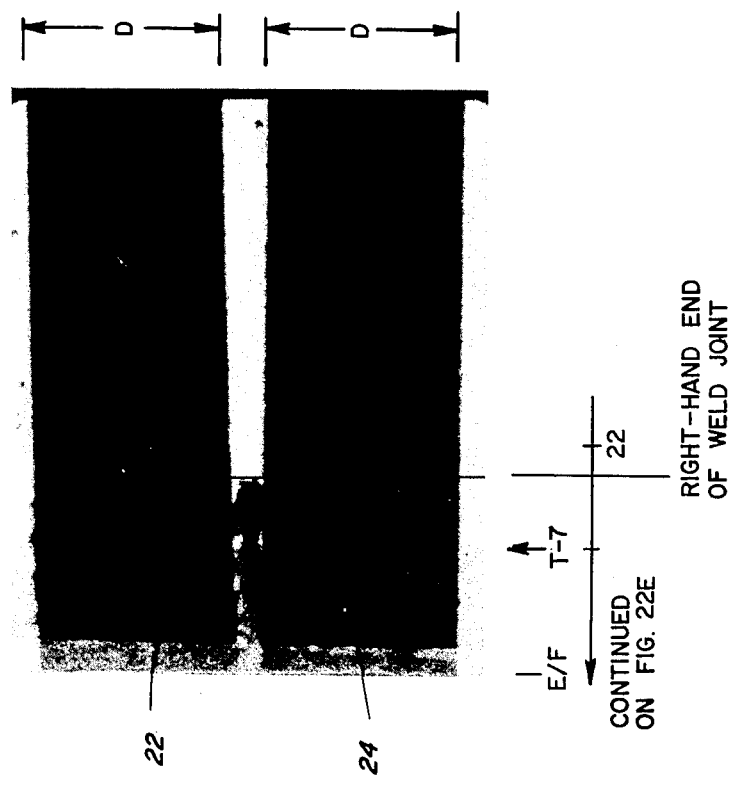

For convenient reference, a scale of arbitrary length units 1-22 has been shown along the bottom of FIGS. 22A-22F with the zero point of the scale being longitudinally aligned with the left-hand end of the welded joint on FIG. 22A.

The resolidified thickness of each strap portion is merged at the interface with the resolidified thickness of the other strap portion to define a continuous resolidified region generally coextensive in length and width with the interface. The resolidified region is not necessarily uniform in thickness throughout the length of the welded joint. Further, there may be some small variation in thickness across the width of the joint.

The thickness of the resolidified region forming the welded joint was measured for various locations along the length of the joint longitudinal cross section as indicated by the longitudinal reference identifiers T-1, T-2, T-3, T-4, T-5, and T-6 in FIGS. 22A-22F. The measured thickness of the resolidified region at these locations in the actual specimen is set forth in the following Table 1 .

TABLE 1

| LOCATION ALONG LENGTH OF WELDED JOINT | WELDED JOINT THICKNESS (millimeters) |
| --- | --- |
| T-1 | 0.09 |
| T-2 | 0.13 |
| T-3 | 0.10 |
| T-4 | 0.06 |
| T-5 | 0.10 |
| T-6 | 0.15 |
| T-7 | 0.09 |

Figure 12:
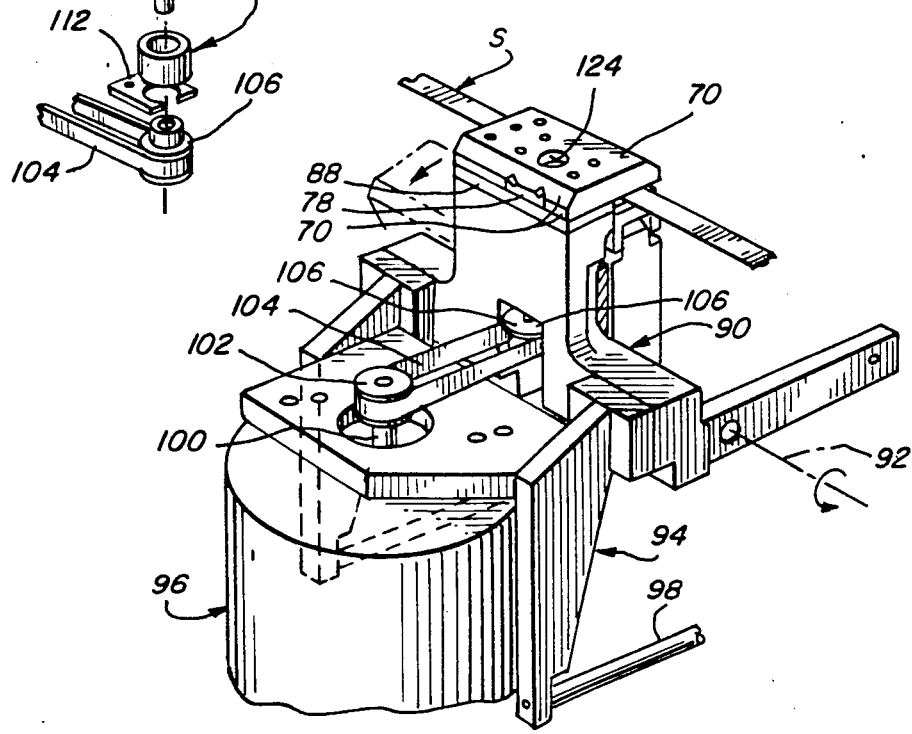
FIG. 12 is a perspective view of the gripping and sealing assembly components illustrated in FIGS. 9 and 11, but viewed from inside the machine looking toward the rear.

It can be seen that the joint includes cavities 50 of the type previously discussed with reference to FIG. 12. It is to be noted that most of the cavities 50 visible along the planar longitudinal cross-section photomicrograph view of the welded joint illustrated in FIGS. 22A-22F do not present a circular profile. Although not illustrated, the profiles of most of the cavities 50 when viewed in plan (perpendicular to the plane of FIGS. 22A-22F) similarly do not appear as perfect circles. Thus, most of the cavities 50 do not have precisely spherical configurations. Rather, most of the cavities 50 each have a volumetric configuration that is irregular as can be seen from the profiles illustrated in FIGS. 22A-22F.

It is to be realized that the longitudinal cross-section of the joint illustrated in FIGS. 22A-22F was taken at one selected plane along the length of the weld. Other longitudinal cross-sectional views, if taken along parallel planes throughout the width of the joint, would show analogous cavity distributions, cavity sizes, and cavity shapes. The concentration of cavities at any point along the length of the longitudinal cross-section is substantially constant across the width of the welded joint at that point.

The welded joint illustrated in FIGS. 22A-22F may be more particularly characterized by specifically describing the distribution of the cavities 50 along the planar longitudinal cross-section of the joint. To this end, the joint resolidified region can be characterized as including an end portion at one end, an end portion at the other end, and a central portion defined between the two end portions.

Most of the cavities 50 are concentrated in the two end portions if each end portion is defined in this specimen as comprising about 30% of the length of the resolidified region and if the central portion is defined as comprising about 40% of the length of the resolidified region intermediate the end portions. The left-hand end portion can thus be characterized as extending from the reference scale numeral 0 in FIG. 22A to the reference scale numeral 6 in FIG. 22B. The right-hand end portion can be characterized as extending from the right-hand end of the joint in FIG. 22F toward the left to the reference scale numeral 16 in FIG. 22D. The central portion of the joint then extends from the reference scale numeral 6 to the reference scale numeral 16.

For the particular example joint illustrated in FIGS. 22A-22F, the concentration of cavities 50 in the central portion is very low compared to the concentration of the cavities 50 in the end portions. There are very few cavities of significant size in the central portion. The planar longitudinal cross-section of the central portion illustrated in FIGS. 22A-22F intersects less than six cavities that have a major dimension greater than 25% of the joint resolidified region thickness as measured at the cavity location. On the other hand, the planar longitudinal cross-section in either of the end portions intersects more than twenty cavities that each have a major dimension greater than 25% of the joint resolidified region thickness as measured at the cavity location.

It should also be noted that many of the cavities in the end portions are relatively large compared to the thickness of the resolidified region. For example, the planar longitudinal cross-section in either of the end portions intersects more than 6 cavities that each have a major dimension greater than 50% of the joint resolidified region thickness at the cavity location.

As can be seen by reference to Table 1 above and to FIGS. 22A-22F, the welded joint solidified region thickness is at a maximum at a point in each end portion of the joint—where the encapsulated cavities 50 are most highly concentrated and have the largest dimensions.

Each end portion may be further characterized as including an outer portion extending from an end of the joint inwardly for a distance equal to about 4-5% of the length of the resolidified region. The outer portion of the left-hand end portion extends from the reference scale numeral 0 at the left-hand end of the joint in FIG. 22A to about the reference scale numeral 1 in FIG. 22A. At the other end of the joint, the outer portion of the right-hand end portion extends from the right-hand end of the joint shown in FIG. 22F toward the left to approximately the reference scale numeral 21 in FIG. 22E. The total volume of the cavities 50 in each outer portion is seen to be substantially less than the total volume of the cavities in the remainder of the associated end portion.

EXAMPLE II

Additional pairs of overlapping, untensioned portions of polyethylene terephthalate strap having an intrinsic viscosity in the range between 0.62 and 0.70 were welded together in the test apparatus described above for EXAMPLE I. Each strap segment had a width of 11 mm. and a thickness of 0.5 mm. The overlapping strap portions were pressed together over a weld length of 15.8 mm. One of the overlapping strap portions was transversely oscillated relative to the other at a frequency of 316 hertz at an amplitude of 1.6 mm. A number of welds were made in identical pairs of overlapping strap segments under such conditions. The welding time was varied between 300 and 400 milliseconds, and the welding pressure was varied between 5.0 megapascals and 12.6 megapascals. The welding pressure on the overlapping strap portions was released while the weld plate was still vibrating at 316 hertz. The joint strength of the resulting welds was found to be consistently greater than 80% of the strap strength.

Preferred Apparatus For Producing The Improved Welded Joint

The Preferred Apparatus Components In An Automatic Strapping Machine

It has been proposed to develop a commercial form of an apparatus for making the improved welded joint of the present invention in an automatic strapping machine. A preferred form of the apparatus in such a machine is next described.

Referring now to the drawings, an automatic strapping machine 52 is shown in its entirety in FIG. 5. Strap S is fed to the machine 52 from a dispenser 53 through an accumulator 54. The dispenser 53 and accumulator 54 may be of a suitable special or conventional design.

The strap S is fed through a lower housing 55 of the machine 52 and around a chute 56 on top of the housing 55. The housing 55 defines an object receiving station in which is placed the object (not shown in FIG. 5) that is to be bound with the strap S. The chute 56 may be of a special design or may be of a suitable conventional design.

In the lower housing 55 of the machine 52 there are appropriate strap feeding and tensioning mechanisms (not illustrated). Such mechanisms first feed the strap S into the chute 56 to form the loop and then subsequently tension the strap S tight about the object. The feeding and tensioning assembly may be of a special design or may be of a suitable conventional design.

Suitable designs for a dispenser 53, accumulator 54, chute 56, and feeding and tensioning assembly are employed in the power strapping machine sold in the U.S.A. under the designation SPIRIT TM Strapping Machine by Signode Corporation, 3600 West Lake Avenue, Glenview, Ill. 60025, U.S.A. and are described in the "OPERATION, PARTS AND SAFETY MANUAL" for the machine as published by Signode Corporation under the designation "286022" and dated "8/85."

The strap gripping and sealing assembly for use in the strapping machine 52 is located in the machine lower housing 55 below the chute 56 and generally in the region identified by the dashed line circle 57 in FIG. 5. The assembly includes various anvil, gripper, platen, cutter, and vibrator weld plate components, and such components are described in detail hereinafter.

The components comprising the strap gripping and sealing assembly for the machine 52 are illustrated in more detail in FIGS. 6–12. At the horizontal top surface of the housing 55, as best illustrated FIGS. 6–8, the strap chute 56 has appropriate strap receiving sections 60 which each define a slot or channel 62 for receiving the strap S. Any suitable strap receiving section structure may be provided, such as that incorporated in the above-discussed SPIRIT TM Strapping Machine marketed in the U.S.A. by Signode Corporation and described in the above-identified "OPERATION, PARTS AND SAFETY MANUAL" for that machine. However, for purposes of the present description, there is illustrated in FIGS. 6 et seq. a specific embodiment of the strap receiving section 60 that has a generally sideways oriented, U-shaped configuration.

The opening of channel 62 in each section 60 is normally blocked by retaining members 64. These retain the strap S in the channel 62 when the section 60 is in the position illustrated in solid line in FIG. 7.

Each strap receiving section 60 is movable in the direction of the arrow 66 to a retracted position illustrated by the broken lines in FIG. 7. In the retracted position, the section 60 is spaced from the retaining member 64, and the strap S is free to be pulled out of the slot 62 against the object being bound.

The means for moving the strap receiving sections 60 between the two positions illustrated in FIG. 7 may be of any suitable conventional design (e.g., electric solenoid operators, hydraulic operators, or other mechanical drive mechanisms), the details of which form no part of the present invention.

To provide a convenient support surface for an object being bound, the machine lower housing 55 preferably includes generally horizontally disposed package or object support plates 74 and 75 which each define an upper horizontal surface adjacent the sections 60.

An anvil 70 is provided between two spaced-apart strap receiving sections 60 as illustrated in FIG. 5 and 8. The anvil 70 is also moveable, in the direction indicated by the arrow 72 in FIG. 6, from an extended position over the path of the strap S to a retracted position (shown in broken lines in FIG. 10) which will permit the strap S, after the strap loop has been tensioned and welded, to snap upwardly tight against the bottom of the object being bound.

Figure 11:
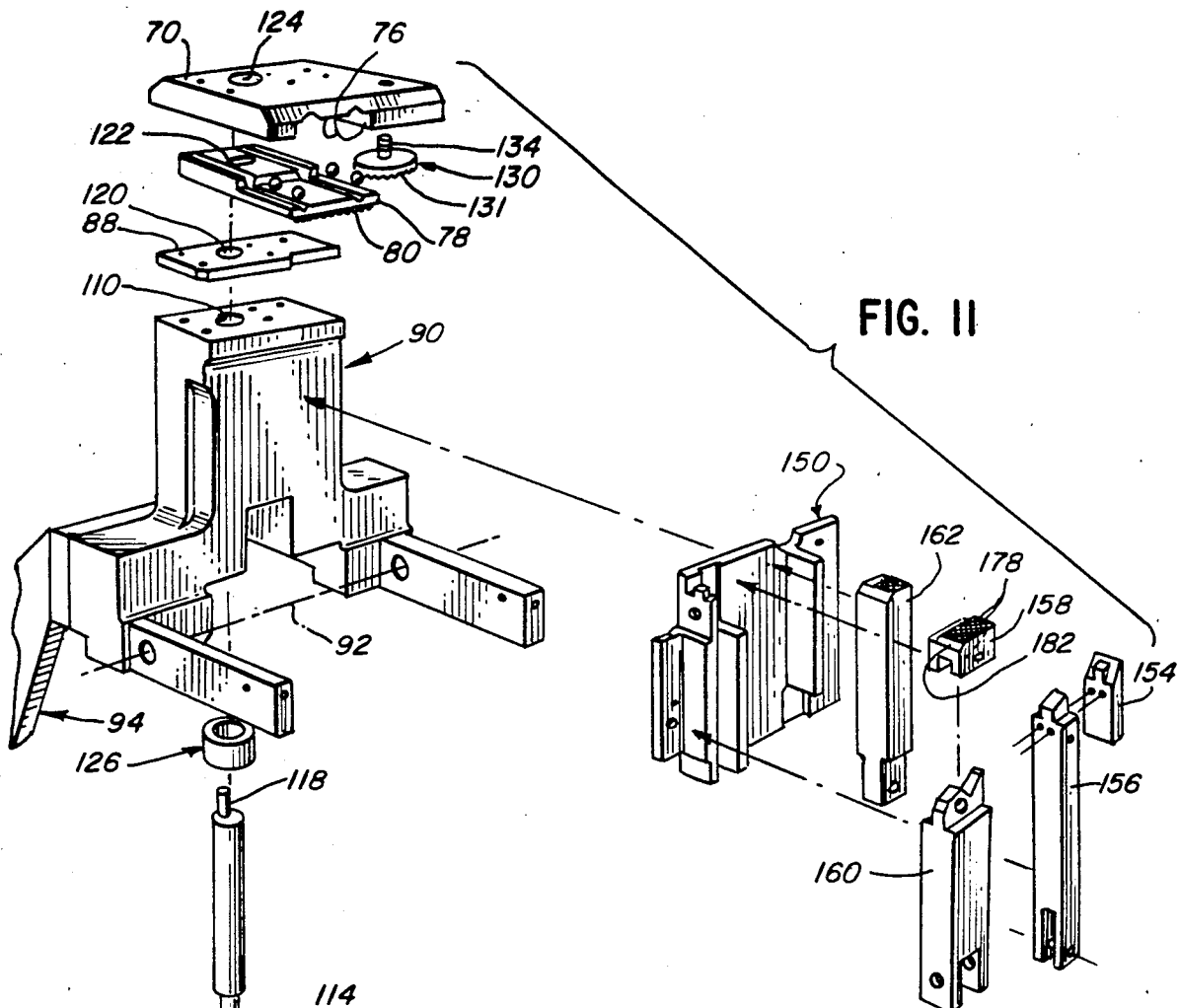
FIG. 11 is an exploded, perspective view of the gripping and sealing assembly components illustrated in FIG. 9.

As best illustrated in FIGS. 8 and 11, the anvil 70 defines a recess 76 in which is received a vibrator pad or weld plate 78 having downwardly projecting teeth 80. The weld plate 78 functions as a strap engaging member for engaging the upper overlapping strap portion 22 and for effecting oscillation of the strap portion 22. In the preferred embodiment, each tooth projects downwardly about 0.35 mm. The base of each tooth, in plan, defines a rhombus in which two of the interior vertex angles are each about 60° and in which two of the interior vertex angles are each about 120°. The four exterior sides of each tooth converge inwardly to a point and are incined at an angle of about 60° to the surface of the weld plate containing the teeth 80. The teeth 80 are preferably arranged in a uniform array with a tip-to-tip spacing of between about 1 mm. and about 2 mm.

Figure 10:
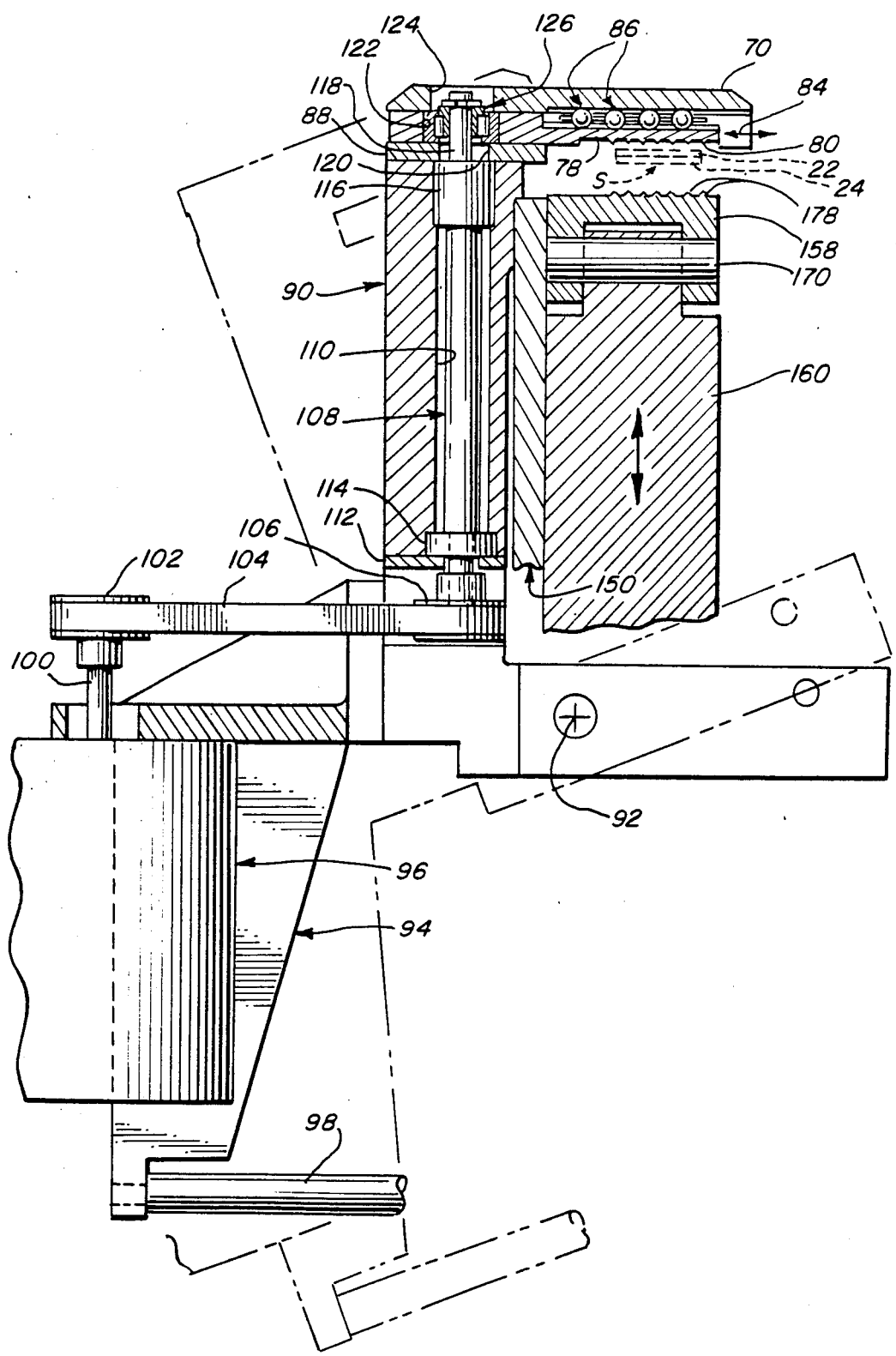
FIG. 10 is a fragmentary, cross-sectional view taken generally along the plane 10—10 in FIG. 6.

The weld plate 78 is mounted for reciprocation relative to the anvil 70 in the direction generally indicated in FIG. 10 by the double-headed arrow 84. To this end, a ball bearing and retainer assembly 86 is interposed between the top of the weld plate 78 and the downwardly facing upper surface of the anvil recess 76.

Part of the bottom of the weld plate 78 rests on a plate 88. The downwardly facing surfaces of the anvil 70 on either side of the anvil recess 76 also rest upon the plate 88. The plate 88 is disposed on top of a frame 90. The frame 90 is pivotally mounted about an axis 92 to a suitable support structure (not illustrated) in the machine 52. The frame 90 is adapted to pivot about the axis 92 between the extended position illustrated in solid line in FIG. 10 and the retracted position illustrated in broken lines in FIG. 10.

A motor mount 94 is attached to the frame 90 for supporting an electric motor 96. A rod 98 is attached to the lower end of the motor mount 94 for being engaged by a suitable mechanism (not illustrated) for pivoting the assembly of the motor mount 94 and frame 90 to the retracted position illustrated in broken lines in FIG. 10. Such a mechanism may include a conventional cam apparatus (not illustrated), and the assembly may be continuously biased to the extended position (illustrated in solid lines in FIG. 10) by a suitable spring (not illustrated).

The weld plate 78 is vibrated by the motor 96. To this end, the motor 96 includes a shaft 100 on which is mounted a pulley 102 as illustrated in FIGS. 10 and 12. A drive belt 104 is trained around the pulley 102 and around another pulley 106 which is mounted to the lower end of an eccentric shaft 108. The eccentric shaft 108 is disposed within a cavity 110 that extends vertically through the frame 90. At the bottom of the frame 90, a bearing retainer 112 is mounted in the frame 90 and retains a bearing 114 around the lower end of the shaft 108.

The upper end of the shaft 108 is journaled within a needle bearing assembly 116 and has an upwardly projecting shaft portion 118 which has a laterally offset longitudinal axis. In the preferred embodiment, the eccentric offset is about 0.8 mm.

The upper shaft portion 118 extends through an aperture 120 in the plate 88, through an elongate aperture 122 in the weld plate 78, and through an aperture 124 in the anvil 70. The aperture 120 in the plate 88 and the aperture 124 in the anvil 70 are each large enough to accommodate the revolution of the eccentric shaft portion 118 without interference.

The upper shaft portion 118 is journaled within a needle bearing assembly 126 in the elongate aperture 122 of the weld plate 78. The bearing assembly 126 engages the opposite sides of the weld plate aperture 122 as illustrated in FIG. 10, but the diameter of the bearing assembly 126 is less than the length of the aperture 122 (as measured along the length of the aperture 122 perpendicular to the plane of the FIG. 10). Thus, rotation of the eccentric shaft 108 by the electric motor 96 effects reciprocation of the weld plate 78 in the directions of the double-headed arrow 84.

As best illustrated in FIGS. 8 and 11, the anvil 70 also carries a rotatable gripper pad 130. The pad 130 has an enlarged lower cylindrical portion 131 with downwardly directed teeth 132. The teeth 132 are similar to the teeth 80 on the weld plate 78 except that each tooth 132 has a square base to provide a pyramid tooth shape. The faces of each tooth converge to a tip at about a 45° angle relative to the surface of the gripper 130 which contains the teeth 132.

Preferably, the outer edge of the enlarged lower cylindrical portion 131 of the gripper 130 is chamfered inwardly at about a 60 degree included angle relative to the surface. This aids the passage of the strap leading end past the gripper 130 during strap feeding.

The rotatable gripper 130 has an upwardly extending cylindrical portion 134 which is reduced in diameter and which is received in a bore 136 in the anvil 70 (FIG. 8). The cylindrical portion 134 defines an annular groove 138 for receiving an O-ring or snap ring 140 which is accomodated in an enlarged diameter bore 142 in the anvil 70. This assembly retains the rotatable gripper 130 in the anvil 70 but permits the gripper 130 to rotate (typically a few degrees in either direction) under the influence of the strap S as the strap contacts the gripper 130 during the strap welding operation which is described in more detail hereinafter.

A plurality of other strap contacting components are provided below the anvil 70 for cooperating with the anvil 70 to effect specific operations on the strap S. These components are best illustrated in FIGS. 8-11.

Specifically, with reference to FIG. 11, a guide plate 150 is mounted to the frame 90 and defines receiving regions or guideways for a cutter knife or blade 154, a cutter blade link 156, a strap-engaging block or platen 158, a platen link 160, and a loop gripper 162.

As best illustrated in FIGS. 8 and 11, the cutter blade 154 is attached to the cutter link 156 by means of two pins 166. The cutter blade 154 is adapted to slide against the side of the platen 158 and may, if desired, slide against the side of the platen link 160.

The platen 158 is pivotally mounted to the link 160 by means of a pin 170 (FIG. 8). The platen 158 is thus pivotable about an axis of rotation which is generally normal to the plane of the strap loop that is formed in the machine.

As best illustrated in FIGS. 9 and 11, the platen 158 has a generally inverted U-shaped configuration and is mounted to the link 160 so that the platen 158 and link 160 cooperate to define a passageway 174 in a strap length receiving region below the upper portion of the platen 158.

The upper surface of the platen 158 preferably includes a plurality of teeth 178 for gripping the strap. The teeth 178 preferably have substantially the same shape and configuration as the the teeth 80 on the overlying weld plate 78. However, the height of each platen tooth 178 in the proposed commerical embodiment is about 0.2 mm.—somewhat less than the height of the weld plate teeth 80.

In the proposed commercial embodiment illustrated, the length of the toothed face of the platen 158 which contacts the strap is about 19 mm. Preferably, the length of this toothed strap-engaging surface is less than the length of the weld plate 78 (as measured parallel to the length of strap below the anvil 70).

The weld plate 78 is disposed within the anvil recess 76 so that the downwardly projecting surfaces of the anvil 70 on either end of the weld plate 78 project below the tips of the teeth 80 on the weld plate 78. The weld plate 78 is recessed by an amount sufficient to prevent contact between the strap and the weld plate teeth 80 when the strap is pulled tight across the bottom of the anvil 70 but is not otherwise pressed against the weld plate 78 by the platen 158. The desirability of this relationship is described hereinafter with reference to operation of the machine.

The platen 158 also preferably has a chamfered corner 182 (FIG. 8). This serves to provide a considerably reduced pressure at the severed end of the strap during the welding step. It has been found that, under some operating conditions and with some types of strap, this chamfered structure results in a somewhat improved quality weld. Specifically, with polyester and polyamide nylon strap, it is believed that such a platen configuration results in improved bubble or cavity formation at the end of the weld adjacent to the chamfer 182.

The loop gripper 162 is slidably disposed in the plate 150 adjacent the platen 158. The loop gripper 162 also has an upwardly facing surface with teeth 186 below the rotatable gripper 130. The loop gripper teeth 186 may have substantially the same shape and spacing as the platen teeth 178 except that the loop gripper teeth 186 preferably have a greater height, about 0.35 mm.

The cutter blade 154 (and connected cutter link 156), the platen link 160, and the loop gripper 162 are moved upwardly and downwardly independently of each other by appropriate mechanisms (not illustrated). These mechanisms may be of any suitable conventional or special design. In the proposed commercial form of the machine, it is contemplated that such motion will be effected with a rotating cam set (not illustrated) and with appropriate cooperating springs (not illustrated) to bias the cutter link 156, the platen link 160, and the loop gripper 162 against the cam set.

To this end, cam follower roller devices (not illustrated) may be mounted to the bottom of the cutter link 156, the platen link 160, and the loop gripper 162 for engaging the cam set. In addition, the platen link 160 may be provided with a suitable multiple spring and lever arm device for enabling the cam set to elevate the platen 158 against the weld plate 78 with a first force during one period in the strapping cycle and to elevate the platen 158 against the weld plate 78 with a second, reduced force at another point in the strapping cycle. Such spring mechanisms, along with the cam set mechanism, are well known to those of ordinary skill in the art. For example, such mechanisms are disclosed in the above-identified "OPERATION, PARTS AND SAFETY MANUAL" for the Signode SPIRIT TM Strapping Machine.

With reference to FIGS. 8 and 9, the strap S is initially fed into the machine 52 over the cutter blade 154. To this end, a moveable strap guide channel 202 is provided adjacent the cutter blade 154 (FIG. 8). The channel 202 is pivotally mounted to the machine about a pin 204. A pin 206 projects from the machine below the channel 202 and prevents the channel 202 from pivoting downwardly beyond the position illustrated in FIG. 8. The channel 202 is normally biased downwardly against the pin 206 by a spring 207. The spring 207 is attached to the machine at one end by means of a pin 208 and is attached at the other end to a pin 210 projecting from the channel 202.

The strap S is initially fed into the end of the channel 202 along a fixed guide 210 (FIG. 8). The bottom of the channel 202 is open adjacent the end of the fixed guide 210 for accommodating a wheel 212 which is mounted to the machine for rotation about an axis 214. The wheel 210 can rotate in response to the movement of the strap into the channel 202, and this reduces the friction drag force on the strap as it is fed through the channel 202.

As best illustrated in FIG. 8, the anvil 70 includes a downwardly angled wall 146 at one end of the anvil 70 adjacent the rotable gripper 130. The wall 146 aids in deflecting the leading edge of the strap S downwardly and into the adjacent strap receiving channel 62 when the strap is first fed below the anvil 70 and into the strap receiving section 60 of the chute 56. Subsequently, after the strap has traveled around the chute 56, and after the leading end of the strap has again passed under the anvil 70 on top of the lower strap portion, the anvil wall 146 functions to prevent further forward movement of the strap leading end (FIG. 13).

The Operation Of The Apparatus Components In The Automatic Strapping Machine The operation of the above-described preferred embodiment of the apparatus in the automatic strapping machine is next described. It has been proposed to operate many of the machine mechanisms through a rotating set of cams (briefly discussed above) controlled by a microprocessor (not illustrated). Actuation, in an automatic strapping machine, of various strap-engaging instrumentalities, such as an anvil, cutter knife, loop gripper, platen, etc., by means of rotating cams is a known, commercial design approach. See, for example, the cam actuator system design for the above-discussed SPIRIT TM Strapping Machine which is sold in the U.S.A. by Signode Corporation and which is described in the above-identified document entitled "OPERATION, PARTS AND SAFETY MANUAL" for the SPIRIT TM Strapping Machine."That document is incorporated herein by reference thereto to the extent pertinent and to the extent not inconsistent with the present disclosure.

Although the proposed commercial form of the machine can be operated by means of the cam set mechanism and related control system, other mechanisms could be used (e.g., electric solenoid actuators, hydraulic or pneumatic actuators, individual electric motors, etc.). However, for completeness, the operation of the machine is set forth hereinafter with reference to a cam set mechanism and related control system, including a drive system, switches, and a microprocessor. The mechanism is briefly described, but without reference to detailed illustrations of conventional design approaches which are well-known to those of ordinary skill in the art.

In the proposed commercial form of the machine, a plurality of adjacent cams are mounted to a cam shaft to form the cam set (hereinafter designated as a "cam" for simplicity). The cam shaft is rotated through a wrap spring clutch or roller ramp clutch as controlled by a microprocessor, and this clutch is driven from a continuously rotating jack shaft from a main motor.

The mounting frame 90 for the anvil 70 is normally spring-biased against the cam to position the anvil 70 over the strap path at the extended location (solid lines in FIG. 10). The anvil 70 is moved to the retracted position by the cam acting against the force of the anvil spring.

The platen link 160 and cutter blade link 156 are normally spring-biased away from the anvil 70 and against the cam. They are raised toward the anvil 70 by the cam against the force of the springs.

The loop gripper 162 is normally spring-biased against the anvil 70 and is adapted to be lowered by the cam acting against the force of the loop gripper spring.

The cam may also be employed to actuate one or more switches for initiating or terminating some machine operations (e.g., deenergizing the strap feeding and tensioning mechanism).

The microprocessor and clutch for driving the cam can function in a conventional manner. In general, the following operation is typical. The cam shaft is designed to complete one full rotation once during each strapping cycle, but is sequentially stopped during each strapping cycle at selected points corresponding to increments of less than a complete rotation. To this end, the cam shaft on which the cam is mounted carries a plurality of target lugs which are circumferentially spaced apart around the cam shaft (for example at 60° increments or other increments) and which rotate with the cam shaft. One or more proximity sensing switches are disposed at fixed locations adjacent the cam shaft to sense the presence of the target lugs as they rotate past the proximity switches during cam shaft rotation. Each proximity switch sends a signal to the microprocessor when a target lug is adjacent the switch but does not send a signal when there is no target lug adjacent the switch. The signals from one of the proximity switches may be used by the microprocessor in counting the number of target lugs that have rotated past the switch so as to identify the rotational position of the cam shaft during each strapping cycle.

The cam shaft is connected to the driven part of the clutch. The driven part of the clutch includes outwardly directed, circumferentially spaced teeth for being engaged by a pawl. The teeth may be spaced apart, for example, at increments that would correspond to the selected rotation increments of the cam shaft. The pawl is normally spring-biased against the clutch driven part so as to engage a tooth at every selected increment of cam shaft rotation for preventing rotation of the clutch driven part, and hence, of the cam shaft and cam. The driving part of the clutch slips when the driven part of the clutch is prevented from rotating by the engaged pawl. The pawl can be disengaged from a tooth of the clutch driven part by means of an electric solenoid which is energized in response to a signal from the microprocessor.

Some or all of the incremental rotation stops of the cam shaft may each be maintained for a time interval that is pre-programmed into the timer system of the microprocessor. This "stationary" cam time interval can be maintained when a tooth on the clutch driven part is engaged by the spring-biased pawl to terminate rotation of the clutch driven part (and of connected cam shaft) and one of the cam shaft target lugs is adjacent one of the proximity switches. This causes a signal to be sent by the switch to the microprocessor. This signals the microprocessor timer circuit to begin the timing of the programmed interval during which the cam shaft is stationary. After the timer system has timed the end of the interval, the microprocessor energizes the cam clutch electric solenoid to move the pawl so as to disengage the tooth on the clutch driven part and permit the clutch driven part to again be rotated by the continuously rotating clutch driving part.

As soon as the cam shaft starts rotating, the rotation of the cam shaft target lug away from the proximity switch causes the proximity switch signal to terminate. In response to that signal termination, the microprocessor deenergizes the clutch electric solenoid which releases the spring-biased pawl so that it can engage the next tooth on the clutch driven part at the end of the next increment of rotation of the cam shaft.

If desired, any of the target lugs may have an increased width to extend around part of the cam shaft circumference by an amount sufficient to maintain the proximity switch signal until two (or more) teeth on the clutch driven part rotate past the disengaged pawl. In such a case, the cam shaft would rotate until the wider lug cleared the proximity switch and the pawl was then released by the deenergized solenoid to engage the third tooth (or a subsequent tooth).

At the beginning of a new cycle, the strap is already in place in the chute to form a loop as shown in FIG. 13, and the upper overlapping strap portion 22 is gripped by the raised platen 158. The leading end of the strap S has stopped against the slanted wall 146 of the anvil 70.

With reference to FIG. 13, consider next the position of the strap S in the machine. Beginning with the strap leading end against the wall 146, it is to be noted that the strap extends clockwise under the rotatable gripper 130, between the weld plate 78 and elevated platen 158, through the strap chute receiving sections 60, around the chute 56, back under the anvil 70 below the upper overlapping portion of the strap, through the strap receiving passage 174 defined between the platen 158 and platen link 160, over the cutter blade 154, and into the guide 202.

The upper overlapping strap portion 22 below the anvil 70 is gripped against the weld plate 78 by the platen 158 which had been raised when the cam was rotated through the last increment in the previous cycle. At the end of the last cycle, the pawl had engaged the cam clutch driven part to prevent further rotation of the cam shaft. The microprocessor is programmed not to effect disengagement of the pawl until the strap loop has been tensioned in the next strapping cycle which is initiated by the operator.

The next strapping cycle is initiated by the machine operator actuating a foot switch 220 (FIG. 5). The foot switch 220 actuates the strap loop tensioning mechanism (not illustrated) in the above-discussed tensioning and feeding assembly (not illustrated).

The object to be bound has been omitted from FIGS. 13-20 for ease of illustration. However, the bound object, designated by reference numeral P in FIG. 21, is shown in FIG. 21 with the completed strap loop in place around the object.

The strap loop is tensioned around the object by pulling the strap trailing portion in a direction opposite from the strap feeding direction. This tension pulling direction is indicated in FIG. 14 by the arrowheads on the strap S. As the loop is tensioned, the strap receiving sections 60 are retracted (as illustrated in FIG. 7) to release the strap S which is pulled tight around the exterior of the object being bound.

Typically, a strap tensioning system includes means for sensing the tension force in the strap loop and for terminating the tensioning process when the desired tension level has been released. A signal is typically provided by such a tension sensing device, and the signal may be processed by the microprocessor in the machine 52 to automatically initiate the next step in the cycle. Specifically, in response to such a signal, the microprocessor energizes the cam clutch solenoid to disengage the clutch pawl and permit rotation of the cam through only a first increment of the full rotation. As the cam turns, it permits a spring (not illustrated) to raise the loop gripper 162 for gripping the two overlapping straps together between the loop gripper 162 and the anvil gripper 130 as illustrated in FIG. 15. The loop gripper spring (not illustrated) provides a suitable clamping force (e.g., about 220-320 kilograms of perpendicular clamping force where the loop has been tensioned to about 180 kilograms of tension force).

Next, the strap loop tensioning mechanism is deenergized by a switch actuated by the cam as it continues its rotation. This releases the tension in the trailing portion of the strap to avoid splitting the strap end during subsequent severing of the trailing portion of the strap from the tensioned loop. After the trailing strap portion tension has been released, continued rotation of the cam raises the cutter link 156 and cutter blade 154 to sever the trailing portion of the strap as illustrated in FIG. 16.

When the cutter link 156 and blade 154 are elevated to sever the strap, the top of the cutter link 156 forces the trailing portion of the strap against the upper wall of the pivotable strap guide 202. This forces the strap guide 202 to pivot upwardly against the bottom of the strap receiving section 60. The trailing portion of the strap is pinched by the cutter link 156 against the strap guide 202 as the strap is severed. This prevents the leading end of the severed strap trailing portion from sliding downwardly in the strap guide 202 away from the platen 158.

Next, as illustrated in FIG. 17, continued rotation of cam causes the platen 158 to be lowered following the strap severance (but the rotating cam continues to hold the knife 154 in the raised position). When platen 158 has reached its lowermost position, it is to be noted that the lower overlapping strap portion 24 has pulled out of the passageway 174 and is then on top of the toothed gripper portion of the platen 158.

As soon as the platen 158 lowers away from the strap as described above, the vibrator weld motor 96 (FIG. 10) is started. The vibrator motor 96 starts in response to a switch actuated by the cam. The rotation of the cam is then terminated at the completion of the first increment of rotation by the spring-biased pawl engaging a tooth on the clutch driven part (with the consequent slipping of the clutch drive part). This occurs as the platen 158 approaches its lowermost position. Meanwhile, the energized vibrator motor 96 is approaching its rated speed of rotation.

The vibrator motor 96 requires a predetermined "start-up" period to achieve the desired rotational speed for forming the welded joint. The timing of the vibrator motor start-up interval is initiated by a proximity switch signal in response to a cam shaft target lug stopping adjacent the proximity switch upon termination of the first rotation increment of the cam shaft. After the cam rotation is terminated, the cam remains stationary until the end of the vibrator motor start-up interval.

Figure 18:
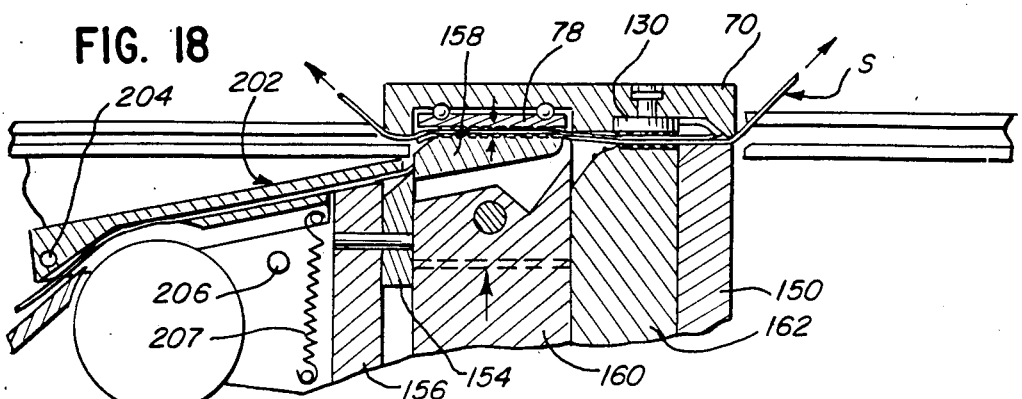

At the end of the vibrator motor start-up interval, the microprocessor energizes the cam clutch solenoid to disengage the pawl and permit continued rotation of the cam. The rotating cam elevates the platen 158 to push the two strap portions together against the vibrating weld plate 78 (FIG. 18). The cam acts on an arm and spring assembly (not illustrated) that is associated with the platen 158 to raise the platen 158 against the overlapping strap portions and overlying weld plate 78 with the desired force of between about 5.2 megapascals and about 6.9 megapascals.

Note that the weld plate 78 is oscillating as the strap portions are pushed into engagement therewith. The cam rotation stops at the next increment position when the pawl again engages another tooth on the cam clutch driven part. At this point, the timer in the microprocessor keeps the cam stationary by not energizing the pawl solenoid for a time period sufficient to maintain the platen 158 in the elevated position (FIG. 18) while the interface region of the overlapping straps becomes molten. The desired weld time interval for this proposed commercial form of the machine is between about 100 and about 200 milliseconds. The oscillating weld plate 78 vibrates the upper strap portion transversely of its length while the loop gripper 162 and rotatable gripper 130 continue to clamp the overlapping strap portions together adjacent the weld plate 78. The transverse movement of the upper strap portion is accommodated by the rotatable gripper 130 which can oscillate about its vertical axis with the upper strap portion.

Figure 19:
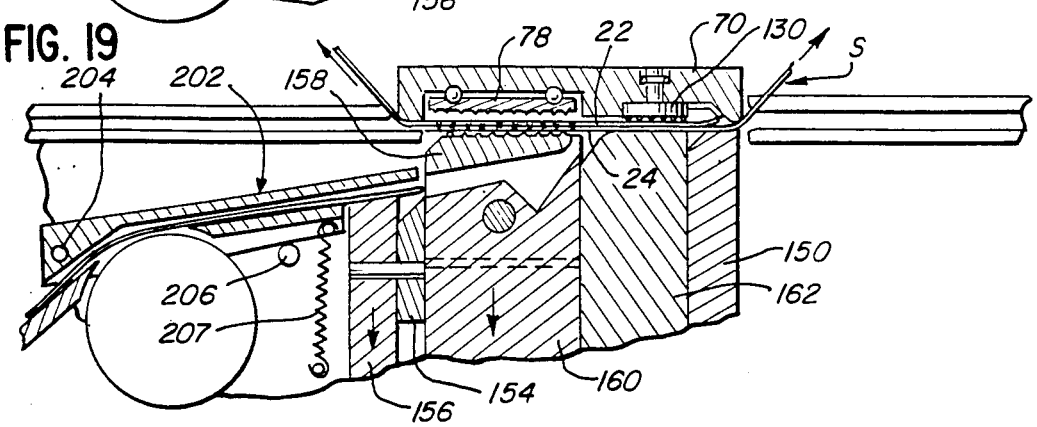

After the predetermined weld time interval has elapsed, the microprocessor energizes the clutch solenoid to effect disengagement of the cam clutch pawl again so as to permit rotation of the cam through another increment. This further increment of cam rotation lowers the cutter blade 154 and lowers the platen 158 away from the vibrating weld plate 78 to the "feed" position as illustrated in FIG. 19. The overlapping strap portions in the loop are still gripped between the elevated loop gripper 162 and anvil gripper 130. Since the loop is under tension, the tensioned, upper overlapping strap portion 22 is pulled away from the recessed, vibrating plate 78 so that the strap portion 22, and the adjacent lower strap portion 24, extend generally straight across the bottom of the anvil 70.

As soon as the platen 158 starts to be lowered away from the vibrating weld plate 78 to release the pressure on the strap, the cam actuates a switch to turn off the vibrator motor 96. Meanwhile, the cam continues rotating toward the next incremental stop position while the strap portions undergo an unpressurized cooling or "cool-down" interval.

For the proposed form of the commercial machine, the unpressurized cooling interval is in a range between about 50 milliseconds and about 60 milliseconds for polyester strap of the commercial sizes earlier described. Surface tension and the inherent stiffness of the short length of each strap portion prevent the lower strap portion 24 from separating from the upper strap portion 22 before the weld solidifies. During the unpressurized cooling interval, the loop gripper 162 still holds the strap portions together against the rotatable gripper 130. Thus, the loop tension cannot act on the lower strap portion 24 at the weld. Thus, there is substantially no tension force tending to pull the strap portions 22 and 24 apart at the weld.

Figure 20:
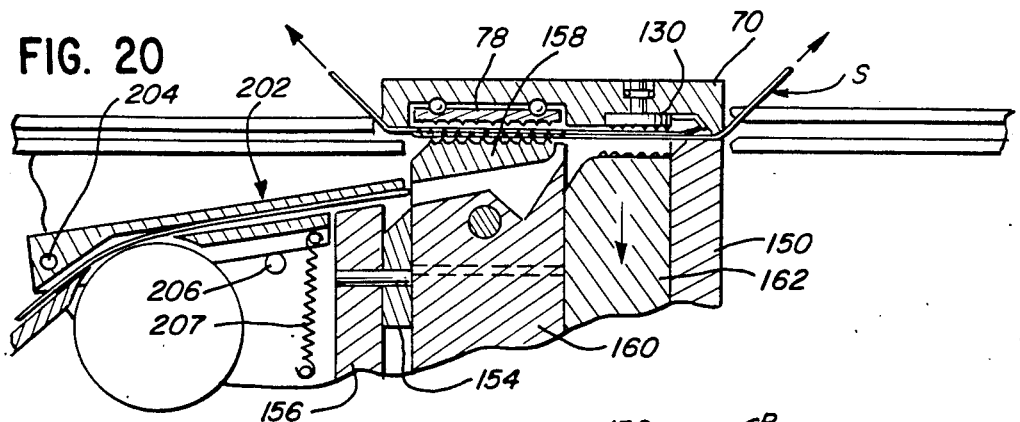
Figure 21:
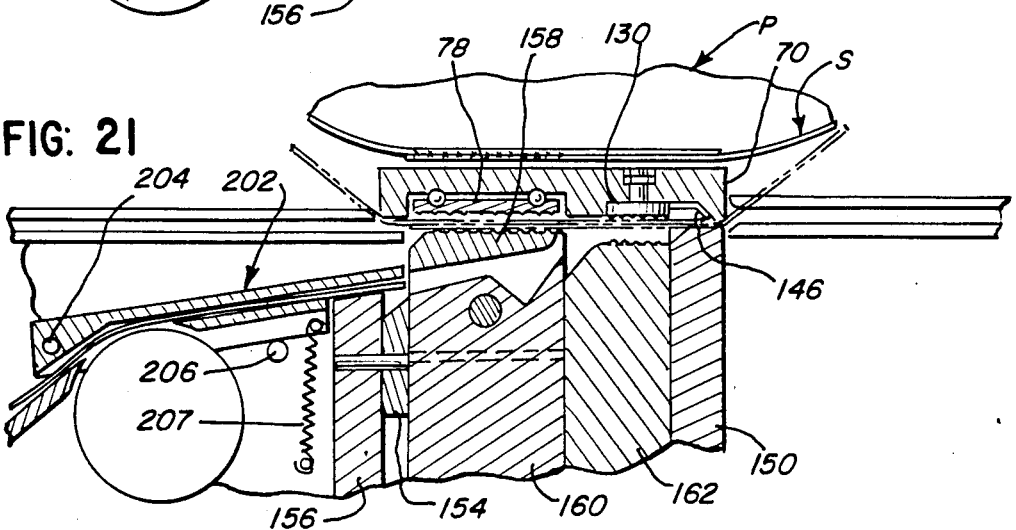

During the cool-down interval, the cam continues to rotate and eventually causes the loop gripper 162 to be lowered as illustrated in FIG. 20 at the end of the cool-down interval. This releases the adjacent, unwelded overlapping strap portions. Simultaneously with the initiation of the loop gripper lowering, the anvil 70 is retracted by the cam so as to be pulled out of the tensioned loop for permitting the loop to snap up against the bound object P as illustrated in FIG. 21.

The cam rotation is terminated at the next incremental stop postion by the clutch pawl when the anvil 70 reaches the point of maximum retraction. The microprocessor timer system maintains this stationary interval for a predetermined length of time that is just sufficiently long to ensure that the welded strap loop has snapped against the bottom of the object and to ensure that the vibration amplitude of the weld plate 78 has been damped to zero.

After this interval, the microprocessor effects momentary disengagement of the cam clutch pawl to again permit the cam to undergo another increment of rotation. This further rotation of the cam drives the anvil 70 back over the strap path. After the anvil 70 is returned to the extended position over the strap path, the clutch pawl stops the cam rotation at the end of the increment of rotation. At that point, the microprocessor initiates feeding of the strap for forming a new loop in the chute 56 (FIG. 5). This is effected by energizing a suitable strap feeding mechanism (not illustrated) in the strap feeding and tensioning assembly (not illustrated).

As the strap is fed into the chute 56, the leading end of the strap hits a conventional chute switch (not illustrated) on the upstream side of the anvil 70. That switch initiates a timer system in the microprocessor which is programmed to continue the strap feeding for a time interval sufficient to permit the strap to continue past the switch, to pass under the anvil 70 on top of the lower strap portion 24, and to finally hit the anvil slanted wall 146. At the end of the time interval, the microprocessor signals the strap feeding mechanism to terminate the strap feeding.

The above-described chute switch signal, in addition to initiating the microprocessor timer interval for accommodating feeding of the strap against the anvil slanted wall 146, is also processed by the microprocessor to initiate another, final incremental rotation of the cam. This rotation of the cam raises the platen 158 for gripping the end of the upper strap portion 22 against the overlying weld plate 78. Preferably, the cam acts through the arm and spring assembly (not illustrated) that is associated with the platen 158 so as to raise the platen 158 to push the upper strap portion 22 against the overlying weld plate 78 with a pressure of between about 10.4 megapascals and about 13.8 megapascals. The machine 52 is then ready to begin the next strapping cycle which can be intitiated by the operator stepping on the foot switch 220 (FIG. 5).

It will be readily observed from the foregoing detailed description of the invention and from the illustrated embodiments thereof that variations and modifications may be effected without departing from the true spirit and scope of the novel concepts or principles of this invention.

What is claimed is:

1. A welded joint between two overlapping face-to-face portions of oriented crystalline thermoplastic strap, said joint comprising an elongated substantially amorphous region unitary with a contiguous crystalline region of each said overlapping strap portions, said amorphous region defining a plurality of closed cavities distributed at least in end portions of said amorphous region.

2. The joint in accordance with claim 1 in which said amorphous region includes a central portion defined between the two end portions, and in which a majority of said cavities are located in said end portions.

3. The joint in accordance with claim 2 in which said end portions defining said cavities have parts that are thicker than the said remaining central portion of said amorphous region.

4. The joint in accordance with claim 2 in which each said end portion comprises about 30% of the length of said amorphous region and said central portion comprises about 40% of the length of said amorphous region.

5. The joint in accordance with claim 4 in which each said end portion includes an outer portion extending from an end of the joint inwardly for a distance equal to about 4% of the length of said amorphous region, and in which the volume of said cavities in said outer portion is substantially less than the volume of said cavities in the remainder of said end portion.

6. The joint in accordance with claim 4 in which any planar longitudinal cross-section of said central portion intersects less than 6 of said cavities that have a major dimension greater than 25% of the joint amorphous region thickness as measured at the cavity location.

7. The joint in accordance with claim 4 in which any planar longitudinal cross-section of either of said end portions intersects more than 20 of said cavities that each have a major dimension greater than 25% of the joint amorphous region thickness as measured at the cavity location.

8. The joint in accordance with claim 4 in which any planar longitudinal cross-section of either of said end portions intersects more than 6 of said cavities that each have a major dimension greater than 50% of the joint amorphous region thickness at the cavity location.

9. The joint in accordance with claim 1 in which the strap material is polyethylene terephthalate having an intrinsic viscosity of about 0.62.

10. The joint in accordance with claim 1 in which the sides of said overlapping strap portions are in registry; in which the length of said joint amorphous region is about 19 mm.; and in which the width of each strap portion is about 11 mm.

11. The joint in accordance with claim 1 in which the thickness of each strap portion is about 0.5 mm. and in which the thickness of said joint amorphous region is between about 0.06 mm. and about 0.15 mm.

12. The joint in accordance with claim 1 in which a majority of said cavities are irregular in shape.

13. A welded joint between two overlapping, face-to-face portions of thermoplastic strap, said joint comprising at least part of the thickness of each said strap portion being resolidified from a fused state, said resolidified thickness part of one said strap portion being merged with said resolidified thickness part of the other strap portion to define a continuous resolidified region, sadi resolidified region including a plurality of encapsulated cavities distributed across the width and thickness of said resolidified region at least adjacent each end of said resolidified region.

14. The joint in accordance with claim 13 in which said resolidified regoin includes an end poriton at one end, an end portion at the other end, and a central portion defined between teh two end portions, and in which a majority of said cavities are located in said end portions.

15. The joint in accordance with claim 14 in which each said end portion comprises about 30% of the length of said resolidified region and said central portion comporises about 40% of the length of said resolidified region.

16. The joint in accordance with claim 14 in which at least some of said cavities contained in said end portions have major dimensions greater than 25% of the joint resolidified region thickness as measured at the cavity location.

17. The joint in accordance with claim 14 in which at least some of said cavities in said end portion have major dimensions greater than 50% of the joint resolidified region thickness at the cavity location.

18. The joint in accordance with claim 13 in which the strap material is polyethylene terephthalate having an intrinsic viscosity of about 0.62.

* * * * *